US012701629B2

(12) United States Patent
Cheng et al.

(10) Patent No.: US 12,701,629 B2
(45) Date of Patent: Aug. 4, 2026

(54) DISCONTINUOUS RECEPTION FOR SIDELINK COMMUNICATIONS IN WIRELESS COMMUNICATIONS SYSTEMS

(71) Applicant: QUALCOMM Incorporated, San Diego, CA (US)

(72) Inventors: Peng Cheng, Beijing (CN); Karthika Paladugu, San Diego, CA (US); Wanshi Chen, San Diego, CA (US); Hong Cheng, Basking Ridge, NJ (US); Gavin Bernard Horn, La Jolla, CA (US); Seyedkianoush Hosseini, San Diego, CA (US); Dan Vassilovski, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 398 days.

(21) Appl. No.: 17/995,916

(22) PCT Filed: May 17, 2020

(86) PCT No.: PCT/CN2020/090715
§ 371 (c)(1),
(2) Date: Oct. 10, 2022

(87) PCT Pub. No.: WO2021/232176
PCT Pub. Date: Nov. 25, 2021

(65) Prior Publication Data
US 2023/0328840 A1     Oct. 12, 2023

(51) Int. Cl.
*H04W 76/28* (2018.01)
*H04W 8/00* (2009.01)

(52) U.S. Cl.
CPC ........... *H04W 76/28* (2018.02); *H04W 8/005* (2013.01)

(58) Field of Classification Search
CPC ... H04W 76/28; H04W 8/005; H04W 56/002; H04W 72/25; H04W 76/14; H04W 88/04;
(Continued)

(56) References Cited

U.S. PATENT DOCUMENTS

2013/0194991 A1     8/2013   Vannithamby et al.
2015/0245295 A1     8/2015   Jha et al.
(Continued)

FOREIGN PATENT DOCUMENTS

CN     105917731 A     8/2016
CN     109891947 A     6/2019
(Continued)

OTHER PUBLICATIONS

International Search Report and Written Opinion—PCT/CN2020/090715—ISA/EPO—Feb. 19, 2021.
(Continued)

*Primary Examiner* — Charles C Jiang
*Assistant Examiner* — Rachel Elizabeth Marks
(74) *Attorney, Agent, or Firm* — Holland & Hart LLP

(57) ABSTRACT

Methods, systems, and devices for wireless communication are described. A user equipment (UE) may transmit sidelink discontinuous reception (DRX) information to a base station while operating in a connected mode. In some examples, the UE may include the sidelink DRX information in UE-assistance information (UAI). The sidelink DRX information may include a preference of a DRX cycle, a DRX active duration, a DRX inactive duration, and the like, for sidelink DRX operation. The UE may receive a message including a sidelink DRX configuration from the base station based on the sidelink DRX information and operate according to the sidelink DRX configuration.

54 Claims, 19 Drawing Sheets

(58) Field of Classification Search

CPC ............. H04W 92/18; H04W 52/0219; H04W 52/0229; H04W 52/0258; H04W 52/0216; H04L 5/001; H04L 5/0023; H04L 5/0033; H04L 5/0082; H04L 5/0091; H04L 5/14; Y02D 30/70

See application file for complete search history.

(56) References Cited

U.S. PATENT DOCUMENTS

| | | | | |
|---|---|---|---|---|
| 2017/0366236 | A1 | 12/2017 | Ryoo et al. | |
| 2018/0206252 | A1 | 7/2018 | Thangarasa et al. | |
| 2019/0053305 | A1 | 2/2019 | Saiwai et al. | |
| 2019/0174411 | A1* | 6/2019 | Xu | H04W 52/02 |
| 2021/0297842 | A1* | 9/2021 | Shrivastava | H04W 28/24 |
| 2022/0353815 | A1* | 11/2022 | Lin | H04W 52/0232 |

FOREIGN PATENT DOCUMENTS

| | | |
|---|---|---|
| WO | WO-2015126725 A1 | 8/2015 |
| WO | 2018064477 A1 | 4/2018 |

OTHER PUBLICATIONS

Supplementary European Search Report—EP20936693—Search Authority—The Hague—Jan. 30, 2024.

3rd Generation Partnership Project; Technical Specification Group Services and System Aspects; Proximity based Services (ProSe) in the 5G System (5GS) (Release 17).

3rd Generation Partnership Project; Technical Specification Group Radio Access Network; NR; NR and NG-RAN Overall Description; Stage 2 (Release 17).

3rd Generation Partnership Project; Technical Specification Group Services and System Aspects; Release 16 Description; Summary of Rel-16 Work Items (Release 16).

3rd Generation Partnership Project; Technical Specification Group Radio Access Network; NR; Medium Access Control (MAC) protocol specification (Release 15).

3rd Generation Partnership Project; Technical Specification Group Radio Access Network; NR; Radio Resource Control (RRC) protocol specification (Release 16).

3rd Generation Partnership Project; Technical Specification Group Radio Access Network; NR; Radio Resource Control (RRC) protocol specification (Release 15).

3rd Generation Partnership Project; Technical Specification Group Radio Access Network; Evolved Universal Terrestrial Radio Access (E-UTRA); Medium Access Control (MAC) protocol specification.

3rd Generation Partnership Project; Technical Specification Group Radio Access Network; Evolved Universal Terrestrial Radio Access (E-UTRA); Radio Resource Control (RRC); Protocol specification (Release 15).

3rd Generation Partnership Project; Technical Specification Group Services and System Aspects; Study on system enhancement for Proximity based Services (ProSe) in the 5G System (5GS) (Release 17).

3GPP TSG-RAN WG2 Meeting #117 Electronic R2-2202343 Online Meeting, Feb. 21-Mar. 3, 2022.

3GPP TSG RAN Meeting #86 RP-193253 Sitges, Spain, Dec. 9-12, 2019.

3GPP TSG RAN Meeting #86 RP-193231 Sitges, Spain, Dec. 9-12, 2019.

\* cited by examiner

DRX Cycle
605

Active DRX Duration
610

Inactive DRX Duration
615

UE 115-k

UE

Monitor
Duration
630

115-l

UE

Offset
Duration
640

Monitor
Duration
635

115-m $t_n$          $t_{n+1}$          $t_{n+2}$

Time (ms)

Discovery Message 620

Uplink/Downlink Messages 625
(Uu Transmission/Reception)

600

1210        1215        1220

1205

1200

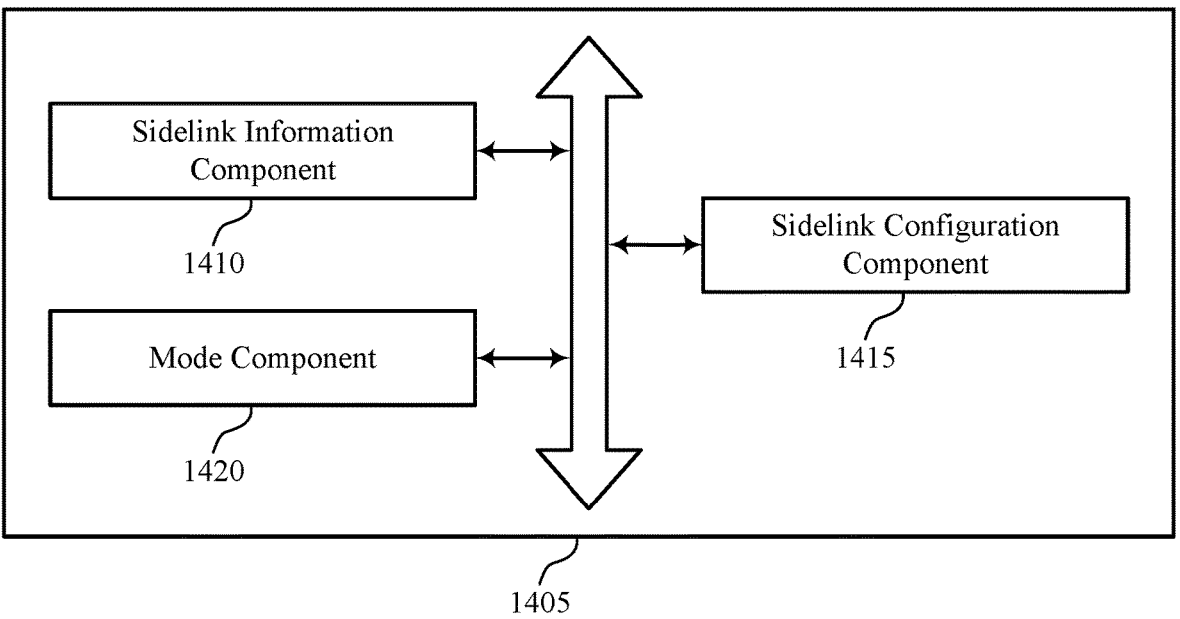
FIG. 14

Transmit sidelink DRX information to a base station while operating in a connected mode ⟩ 1605

Receive a message including a sidelink DRX configuration from the base station based on the sidelink DRX information ⟩ 1610

Operate according to the sidelink DRX configuration ⟩ 1615

1600

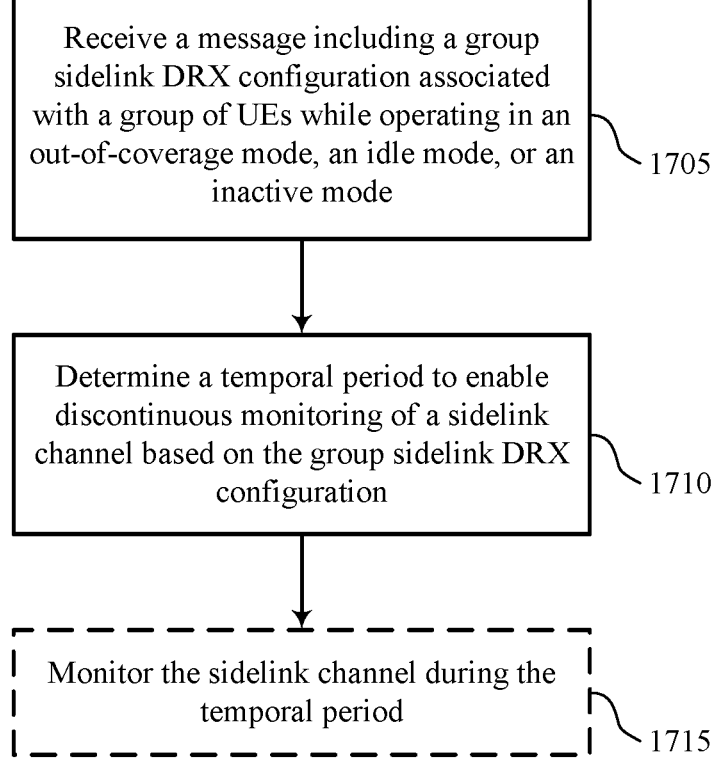

Receive a message including a group sidelink DRX configuration associated with a group of UEs while operating in an out-of-coverage mode, an idle mode, or an inactive mode ⟩ 1705

Determine a temporal period to enable discontinuous monitoring of a sidelink channel based on the group sidelink DRX configuration ⟩ 1710

Monitor the sidelink channel during the temporal period ⟩ 1715

Determine a DRX cycle based on a
sidelink DRX configuration, the DRX
cycle including an active duration and an
inactive duration

1805

Receive a discovery request message from
a second UE during the active duration of
the DRX cycle

1810

Transmit a discovery response message to
a second UE during the active duration of
the DRX cycle

1815

1800

Receive sidelink DRX information from a UE
1905

Determine a sidelink DRX pattern for the UE based on the sidelink DRX information
1910

Transmit a message including a sidelink DRX configuration including an indication of the sidelink DRX pattern for the UE
1915

1900

DISCONTINUOUS RECEPTION FOR SIDELINK COMMUNICATIONS IN WIRELESS COMMUNICATIONS SYSTEMS

CROSS REFERENCE

The present Application is a 371 national stage filing of International PCT Application No. PCT/CN2020/090715 by Cheng et al. entitled "DISCONTINUOUS RECEPTION FOR SIDELINK COMMUNICATIONS IN WIRELESS COMMUNICATIONS SYSTEMS," filed May 17, 2020, which is assigned to the assignee hereof, and which is expressly incorporated by reference in its entirety herein.

INTRODUCTION

The following relates to wireless communications, and more specifically to managing sidelink communications in wireless communications systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support sidelink communications between multiple communication devices. Examples of sidelink communications may include, but are not limited to, device-to-device (D2D) communications, vehicle-based communications, which may also be referred to as vehicle-to-everything (V2X) communications systems, vehicle-to-vehicle (V2V) communications systems, cellular V2X (C-V2X) communications systems, and the like.

SUMMARY

A method of wireless communication at a UE is described. The method may include transmitting sidelink DRX (DRX) information to a base station while operating in a connected mode, receiving a message including a sidelink DRX configuration from the base station based on the sidelink DRX information, and operating according to the sidelink DRX configuration.

An apparatus for wireless communication is described. The apparatus may include a processor, and memory coupled with the processor, the processor and memory configured to transmit sidelink DRX information to a base station while operating in a connected mode, receive a message including a sidelink DRX configuration from the base station based on the sidelink DRX information, and operate according to the sidelink DRX configuration.

Another apparatus for wireless communication is described. The apparatus may include means for transmitting sidelink DRX information to a base station while operating in a connected mode, receiving a message including a sidelink DRX configuration from the base station based on the sidelink DRX information, and operating according to the sidelink DRX configuration.

A non-transitory computer-readable medium storing code for wireless communication at a UE is described. The code may include instructions executable by a processor to transmit sidelink DRX information to a base station while operating in a connected mode, receive a message including a sidelink DRX configuration from the base station based on the sidelink DRX information, and operate according to the sidelink DRX configuration.

Some examples of the method, apparatuses, and non-transitory computer-readable medium described herein may further include operations, features, means, or instructions for monitoring a sidelink channel to receive a discovery signal from a second UE during an active duration of a DRX cycle based on the sidelink DRX configuration, and receiving the discovery signal from the second UE based on the monitoring.

In some examples of the method, apparatuses, and non-transitory computer-readable medium described herein, the sidelink DRX configuration may be based on a discovery resource pool corresponding to time and frequency resources associated with monitoring the sidelink channel to receive the discovery signal from the second UE.

Some examples of the method, apparatuses, and non-transitory computer-readable medium described herein may further include operations, features, means, or instructions for broadcasting a discovery request message during the active duration of the DRX cycle based on the sidelink DRX configuration, monitoring the sidelink channel to receive a discovery response message from the second UE during the active duration of the DRX cycle, and receiving the discovery response message from the second UE based on the monitoring, the discovery signal including the discovery response message.

Some examples of the method, apparatuses, and non-transitory computer-readable medium described herein may further include operations, features, means, or instructions for selecting the second UE for relay communications between the UE and the base station, or between the UE and a third UE, or both, based on the discovery signal, where the relay communications correspond to a layer 2 (L2) forwarding function or a layer 3 (L3) forwarding function.

Some examples of the method, apparatuses, and non-transitory computer-readable medium described herein may further include operations, features, means, or instructions for determining, based on the sidelink DRX configuration, a sidelink DRX pattern for monitoring the sidelink channel to receive the discovery signal from the second UE, the sidelink DRX pattern including the DRX cycle including the active duration and an inactive duration.

Some examples of the method, apparatuses, and non-transitory computer-readable medium described herein may further include operations, features, means, or instructions for receiving a synchronization signal from the second UE on a sidelink broadcast channel, and synchronizing with the second UE based on the synchronization signal.

Some examples of the method, apparatuses, and non-transitory computer-readable medium described herein may further include operations, features, means, or instructions for receiving a downlink signal from the base station using a cellular link based on the sidelink DRX configuration; or, and transmitting an uplink signal to the base station using the cellular link based on the sidelink DRX configuration.

Some examples of the method, apparatuses, and non-transitory computer-readable medium described herein may further include operations, features, means, or instructions for determining, based on the sidelink DRX configuration, a sidelink DRX pattern for receiving the downlink signal or transmitting the uplink signal, or both, the sidelink DRX pattern including a DRX cycle including an active duration and an inactive duration, where receiving the downlink signal or transmitting the uplink signal, or both, may be based on the sidelink DRX pattern.

In some examples of the method, apparatuses, and non-transitory computer-readable medium described herein, receiving the message may include operations, features, means, or instructions for receiving a radio resource control (RRC) reconfiguration message including the sidelink DRX configuration from the base station.

Some examples of the method, apparatuses, and non-transitory computer-readable medium described herein may further include operations, features, means, or instructions for transmitting an RRC reconfiguration complete message to the base station based on the RRC reconfiguration message, where operating according to the sidelink DRX configuration may be based on the RRC reconfiguration complete message.

Some examples of the method, apparatuses, and non-transitory computer-readable medium described herein may further include operations, features, means, or instructions for including the sidelink DRX information in UE-assistance information (UAI), transmitting the UAI including the sidelink DRX information to the base station while operating in the connected mode, where receiving the message including the sidelink DRX configuration may be based on the UAI.

Some examples of the method, apparatuses, and non-transitory computer-readable medium described herein may further include operations, features, means, or instructions for determining a single connected mode DRX cycle for sidelink communications or cellular communications, or both, based on the sidelink DRX configuration, and where operating according to the sidelink DRX configuration may be based on the single connected mode DRX cycle.

Some examples of the method, apparatuses, and non-transitory computer-readable medium described herein may further include operations, features, means, or instructions for determining a DRX cycle based on a relay service associated with a second UE or a quality-of-service (QoS) associated with data traffic for the UE, or both, where the sidelink DRX information includes an indication of the DRX cycle.

Some examples of the method, apparatuses, and non-transitory computer-readable medium described herein may further include operations, features, means, or instructions for determining a value of an activity timer associated with a DRX cycle based on a relay service associated with a second UE or a QoS associated with data traffic for the UE, or both, where the sidelink DRX information includes an indication of the value of the activity timer associated with the DRX cycle.

Some examples of the method, apparatuses, and non-transitory computer-readable medium described herein may further include operations, features, means, or instructions for determining a value of an inactivity timer associated with a DRX cycle based on a relay service associated with a second UE or a QoS associated with data traffic for the UE, or both, where the sidelink DRX information includes an indication of the value of the inactivity timer associated with the DRX cycle.

Some examples of the method, apparatuses, and non-transitory computer-readable medium described herein may further include operations, features, means, or instructions for determining an offset between a beginning of a DRX cycle and a beginning of an active duration of the DRX cycle based on a relay service associated with a second UE or a QoS associated with data traffic for the UE, or both, where the sidelink DRX information includes an indication of the offset.

Some examples of the method, apparatuses, and non-transitory computer-readable medium described herein may further include operations, features, means, or instructions for determining a first sidelink DRX pattern associated with the sidelink DRX configuration for monitoring a sidelink channel to receive a discovery signal based on the sidelink DRX configuration, determining a second sidelink DRX pattern associated with the sidelink DRX configuration for receiving a downlink signal from the base station or transmitting an uplink signal to the base station, or both, based on the sidelink DRX configuration, where the first sidelink DRX pattern may be different from the second sidelink DRX pattern.

In some examples of the method, apparatuses, and non-transitory computer-readable medium described herein, the sidelink DRX configuration includes a first indication of the first sidelink DRX pattern or a second indication of the second sidelink DRX pattern, or both.

In some examples of the method, apparatuses, and non-transitory computer-readable medium described herein, the sidelink DRX configuration includes a connected mode DRX configuration.

In some examples of the method, apparatuses, and non-transitory computer-readable medium described herein, the sidelink DRX configuration includes a sidelink DRX preference associated with a discovery procedure including a first model discovery procedure or a second model discovery procedure.

In some examples of the method, apparatuses, and non-transitory computer-readable medium described herein, the sidelink DRX configuration includes a sidelink DRX preference associated with receiving a downlink signal from the base station or transmitting an uplink signal to the base station, or both.

In some examples of the method, apparatuses, and non-transitory computer-readable medium described herein, the UE includes a remote UE and a second UE includes a relay UE between the remote UE and the base station.

A method of wireless communication at a UE is described. The method may include receiving a message including a group sidelink DRX configuration associated with a group of UEs while operating in an out-of-coverage mode, an idle mode, or an inactive mode, determining a temporal period to enable discontinuous monitoring of a sidelink channel based on the group sidelink DRX configuration, and monitoring the sidelink channel during the temporal period.

An apparatus for wireless communication is described. The apparatus may include a processor, and memory coupled with the processor, the processor and memory configured to receive a message including a group sidelink DRX configuration associated with a group of apparatuses while operating in an out-of-coverage mode, an idle mode, or an inactive mode, determine a temporal period to enable discontinuous monitoring of a sidelink channel based on the group sidelink DRX configuration, and monitor the sidelink channel during the temporal period.

Another apparatus for wireless communication is described. The apparatus may include means for receiving a message including a group sidelink DRX configuration associated with a group of apparatuses while operating in an out-of-coverage mode, an idle mode, or an inactive mode, determining a temporal period to enable discontinuous monitoring of a sidelink channel based on the group sidelink DRX configuration, and monitoring the sidelink channel during the temporal period.

A non-transitory computer-readable medium storing code for wireless communication at a UE is described. The code may include instructions executable by a processor to receive a message including a group sidelink DRX configuration associated with a group of UEs while operating in an out-of-coverage mode, an idle mode, or an inactive mode, determine a temporal period to enable discontinuous monitoring of a sidelink channel based on the group sidelink DRX configuration, and monitor the sidelink channel during the temporal period.

In some examples of the method, apparatuses, and non-transitory computer-readable medium described herein, receiving the message may include operations, features, means, or instructions for receiving a system information block (SIB) or an RRC reconfiguration message including the group sidelink DRX configuration.

Some examples of the method, apparatuses, and non-transitory computer-readable medium described herein may further include operations, features, means, or instructions for enabling discontinuous monitoring of the sidelink channel based on the SIB or the RRC reconfiguration message.

Some examples of the method, apparatuses, and non-transitory computer-readable medium described herein may further include operations, features, means, or instructions for disabling a DRX mode based on a QoS associated with pending data traffic satisfying a QoS threshold.

In some examples of the method, apparatuses, and non-transitory computer-readable medium described herein, the group sidelink DRX configuration includes a DRX periodicity common to the group of UEs.

In some examples of the method, apparatuses, and non-transitory computer-readable medium described herein, the sidelink DRX configuration includes an active duration of a DRX cycle common to the group of UEs.

In some examples of the method, apparatuses, and non-transitory computer-readable medium described herein, the sidelink DRX configuration includes a group offset duration between a beginning of a DRX cycle and an active duration of the DRX cycle, where the group offset duration may be common to the group of UEs.

In some examples of the method, apparatuses, and non-transitory computer-readable medium described herein, the temporal period may be common to the group of UEs.

In some examples of the method, apparatuses, and non-transitory computer-readable medium described herein, the UE may be grouped in the group of UEs based on a pathloss parameter.

In some examples of the method, apparatuses, and non-transitory computer-readable medium described herein, the UE may be grouped in the group of UEs based on a QoS associated with data traffic of the UE.

Some examples of the method, apparatuses, and non-transitory computer-readable medium described herein may further include operations, features, means, or instructions for determining a UE-specific offset duration associated with an active duration of a DRX cycle based on the sidelink DRX configuration, where monitoring the sidelink channel includes.

In some examples of the method, apparatuses, and non-transitory computer-readable medium described herein, the UE-specific offset duration may be based on a layer 2 (L2) identifier associated with the UE.

Some examples of the method, apparatuses, and non-transitory computer-readable medium described herein may further include operations, features, means, or instructions for enabling a DRX mode based on the message.

Some examples of the method, apparatuses, and non-transitory computer-readable medium described herein may further include operations, features, means, or instructions for enabling a DRX mode based on a QoS associated with pending data traffic satisfying a QoS threshold.

Some examples of the method, apparatuses, and non-transitory computer-readable medium described herein may further include operations, features, means, or instructions for enabling a DRX mode based on a power level of the UE satisfying a power level threshold.

Some examples of the method, apparatuses, and non-transitory computer-readable medium described herein may further include operations, features, means, or instructions for refraining from monitoring one or more resource pools during an inactive duration of a DRX cycle based on the group sidelink DRX configuration.

Some examples of the method, apparatuses, and non-transitory computer-readable medium described herein may further include operations, features, means, or instructions for refraining from monitoring one or more resource pools associated with monitoring the sidelink channel for a discovery signal based on a group resource pool configuration associated with monitoring for the discovery signal.

Some examples of the method, apparatuses, and non-transitory computer-readable medium described herein may further include operations, features, means, or instructions for broadcasting a discovery request message during an inactive duration of a DRX cycle associated with the group of UEs based on a data traffic condition for the UE, where the inactive duration may be common to the group of UEs, where the inactive duration and the DRX cycle may be common to the group of UEs.

Some examples of the method, apparatuses, and non-transitory computer-readable medium described herein may further include operations, features, means, or instructions for receiving a downlink signal from a base station during an inactive duration of a DRX cycle associated with the group of UEs; or, and transmitting an uplink signal to the base station during the inactive duration of the DRX cycle associated with the group of UEs, where the inactive duration and the DRX cycle may be common to the group of UEs.

Some examples of the method, apparatuses, and non-transitory computer-readable medium described herein may further include operations, features, means, or instructions for synchronizing with the group of UEs based on a synchronization signal received on a sidelink broadcast channel from at least one UE associated with the group of UEs.

A method of wireless communications is described. The method may include determining a DRX cycle based on a sidelink DRX configuration, the DRX cycle including an active duration and an inactive duration, receiving a discovery request message from a second UE during the active duration of the DRX cycle, and transmitting a discovery response message to a second UE during the active duration of the DRX cycle.

An apparatus for wireless communication is described. The apparatus may include a processor, and memory coupled with the processor, the processor and memory configured to determine a DRX cycle based on a sidelink DRX configuration, the DRX cycle including an active duration and an inactive duration, receive a discovery request message from a second UE during the active duration of the DRX cycle, and transmit a discovery response message to a second UE during the active duration of the DRX cycle.

Another apparatus for wireless communication is described. The apparatus may include means for determining a DRX cycle based on a sidelink DRX configuration, the DRX cycle including an active duration and an inactive duration, receiving a discovery request message from a second UE during the active duration of the DRX cycle, and transmitting a discovery response message to a second UE during the active duration of the DRX cycle.

A non-transitory computer-readable medium storing code for wireless communication at a UE is described. The code may include instructions executable by a processor to determine a DRX cycle based on a sidelink DRX configuration, the DRX cycle including an active duration and an inactive duration, receive a discovery request message from a second UE during the active duration of the DRX cycle, and transmit a discovery response message to a second UE during the active duration of the DRX cycle.

In some examples of the method, apparatuses, and non-transitory computer-readable medium described herein, the sidelink DRX configuration may be based on a discovery resource pool corresponding to time and frequency resources for receiving the discovery request message or transmitting the discovery response message, or both.

Some examples of the method, apparatuses, and non-transitory computer-readable medium described herein may further include operations, features, means, or instructions for establishing a connection with the second UE to relay communications for the UE, where the relay communications correspond to a L2 forwarding function or a L3 forwarding function.

Some examples of the method, apparatuses, and non-transitory computer-readable medium described herein may further include operations, features, means, or instructions for transmitting a synchronization signal to the second UE on a sidelink broadcast channel, and synchronizing with the second UE based on the synchronization signal.

A method of wireless communications at a base station is described. The method may include receiving sidelink DRX information from a UE, determining a sidelink DRX pattern for the UE based on the sidelink DRX information, and transmitting a message including a sidelink DRX configuration including an indication of the sidelink DRX pattern for the UE.

An apparatus for wireless communication is described. The apparatus may include a processor, and memory coupled with the processor, the processor and memory configured to receive sidelink DRX information from a UE, determine a sidelink DRX pattern for the UE based on the sidelink DRX information, and transmit a message including a sidelink DRX configuration including an indication of the sidelink DRX pattern for the UE.

Another apparatus for wireless communication is described. The apparatus may include means for receiving sidelink DRX information from a UE, determining a sidelink DRX pattern for the UE based on the sidelink DRX information, and transmitting a message including a sidelink DRX configuration including an indication of the sidelink DRX pattern for the UE.

A non-transitory computer-readable medium storing code for wireless communication at a base station is described. The code may include instructions executable by a processor to receive sidelink DRX information from a UE, determine a sidelink DRX pattern for the UE based on the sidelink DRX information, and transmit a message including a sidelink DRX configuration including an indication of the sidelink DRX pattern for the UE.

In some examples of the method, apparatuses, and non-transitory computer-readable medium described herein, transmitting the message may include operations, features, means, or instructions for transmitting an RRC reconfiguration message including the sidelink DRX configuration to the UE.

Some examples of the method, apparatuses, and non-transitory computer-readable medium described herein may further include operations, features, means, or instructions for receiving an RRC reconfiguration complete message to the base station based on the RRC reconfiguration message.

Some examples of the method, apparatuses, and non-transitory computer-readable medium described herein may further include operations, features, means, or instructions for receiving UAI including the sidelink DRX information from the UE.

Some examples of the method, apparatuses, and non-transitory computer-readable medium described herein may further include operations, features, means, or instructions for determining the sidelink DRX pattern for the UE based on a resource pool configuration for the UE.

Some examples of the method, apparatuses, and non-transitory computer-readable medium described herein may further include operations, features, means, or instructions for determining a first sidelink DRX pattern associated with the sidelink DRX configuration for monitoring a sidelink channel for a discovery signal at the UE based on the sidelink DRX information, and determining a second sidelink DRX pattern associated with the sidelink DRX configuration for receiving a downlink signal from the base station at the UE based on the sidelink DRX information, where the first sidelink DRX pattern may be different from the second sidelink DRX pattern.

In some examples of the method, apparatuses, and non-transitory computer-readable medium described herein, the sidelink DRX configuration includes a connected mode DRX configuration.

In some examples of the method, apparatuses, and non-transitory computer-readable medium described herein, the sidelink DRX configuration includes a sidelink DRX preference.

BRIEF DESCRIPTION OF THE DRAWINGS

FIG. 14 shows a block diagram of a base station communications manager in accordance with one or more aspects of the present disclosure.

FIGS. 16 through 19 show flowcharts illustrating methods in accordance with one or more aspects of the present disclosure.

DETAILED DESCRIPTION

Figure 1:
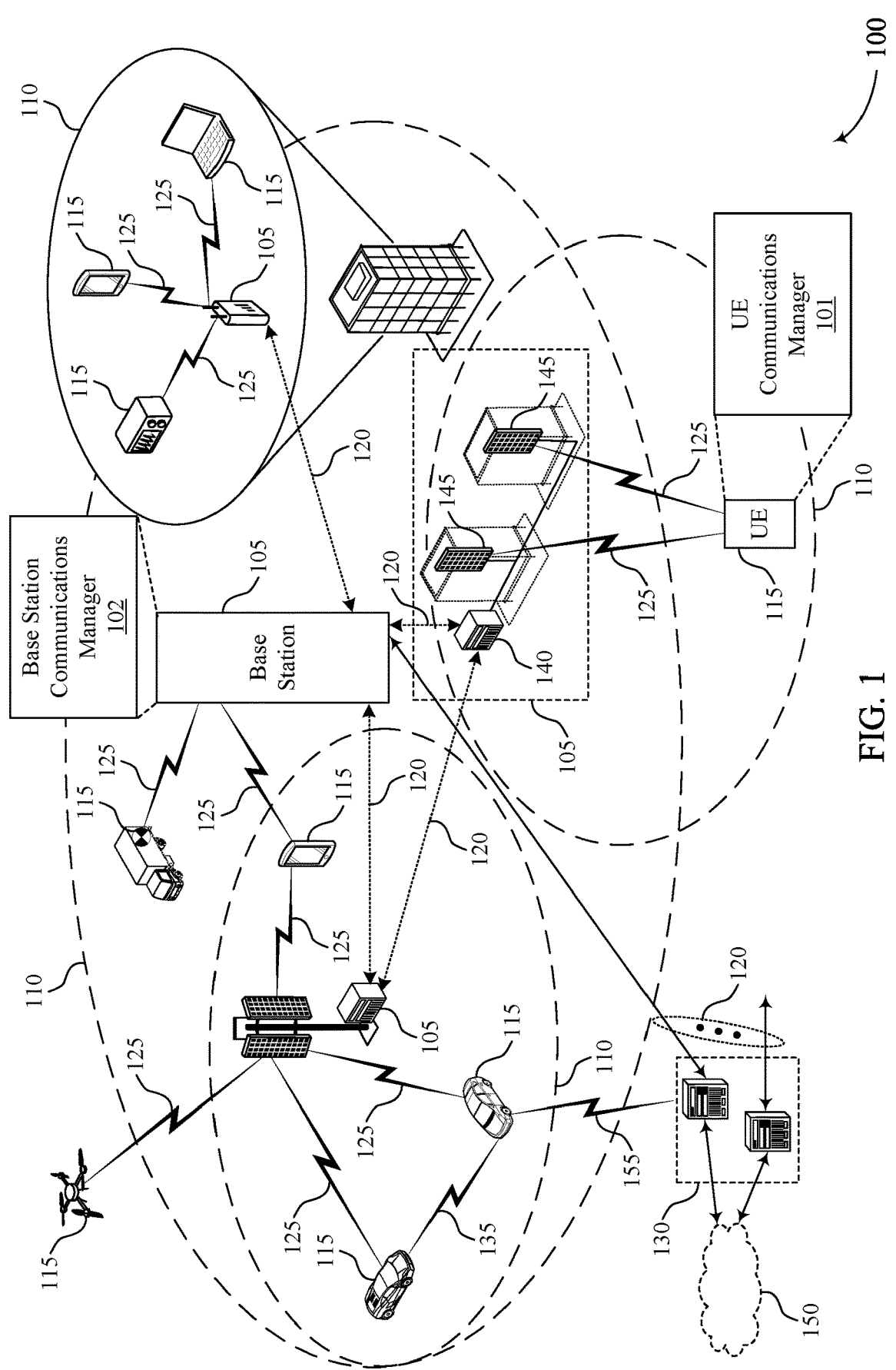
FIGS. 1 and 2 illustrate examples of wireless communications systems in accordance with one or more aspects of the present disclosure.

Wireless communications systems may include multiple communication devices such as UEs and base stations, which may provide wireless communication services to other UEs. For example, base stations may be next-generation NodeBs or giga-NodeBs (either of which may be referred to as a gNB) that may support multiple radio access technologies including 4G systems, such as LTE systems, as well as 5G systems, which may be referred to as NR systems. Some wireless communications systems may also support sidelink communications between multiple UEs. Examples of sidelink communications may include, but are not limited to, D2D communications, vehicle-based communications, which may also be referred to as V2X communications systems, V2V communications systems, etc. Some wireless communications systems may support relay operations to extend network coverage for UEs.

A UE may communicate directly with a network device (e.g., a network operator of a network (e.g., a 4G network, a 5G network)). Alternatively, the UE may communicate with the network device indirectly through another UE (also referred to as a relay UE). For example, a UE and a base station may be unable to communicate directly because the UE may be out-of-coverage for the base station, and hence the demand for a relay UE to relay communications between the UE and the base station. A UE that is out-of-coverage may be referred to herein as a remote UE. A remote UE may discover a relay UE based on discovery messages (also referred to as discovery signals) broadcasted from the relay UE and received at the remote UE as described herein. In another example, the remote UE may announce sidelink discovery solicitation messages to which a relay UE may respond. These discovery messages may include certain information that could be used by the remote UE or the relay UE, or both, to establish a sidelink (also referred to as a sidelink connection) used to relay transmissions to and from the base station, for example, to transmit and receive information related to services provided by the base station. A remote UE seeking to discover a relay UE to function as a relay may, in some cases, consume unnecessary power while monitoring for discovery messages. As a result, a battery life of the remote UE may be affected, which may also impact reliability and latency of receiving information related to the services at the remote UE.

Various aspects of the described techniques relate to configuring the remote UE to operate in a power saving mode (also referred to as a DRX mode) to reduce its power consumption when discovering and selecting a relay UE to function as a relay between the remote UE and the base station. While in the power saving mode, the remote UE may power-ON appropriate circuitry for some period to monitor a wireless channel for discovery messages from other UEs. After the period lapses, the remote UE may power-OFF for some other period. The power saving mode, including the periods for powering ON and OFF, may be specific for when the remote UE monitors for discovery messages for candidate relay UEs. Upon detecting a candidate relay UE, based on the discovery messages, the remote UE may select the candidate relay UE to function as a relay based on a sidelink quality satisfying a threshold or that the candidate relay UE can provide a connectivity service requested by the remote UE, or the like. The remote UE may evaluate the former condition by performing measurements on the discovery messages received from the candidate relay UE, and it checks the latter condition by referring to a field (e.g., a relay service code) included in the discovery messages provided by the candidate relay UE.

The periods associated with the power saving mode may be configured and provided by the base station based on information provided by the remote UE. For example, the remote UE may provide a DRX preference indicating a preference of one or more DRX parameters including a DRX cycle, an active duration of a DRX cycle, an inactive duration of a DRX cycle, a DRX cycle, a periodicity of a DRX cycle, an offset period associated with an active duration of a DRX cycle, a DRX inactivity timer, a DRX activity timer, a DRX retransmission timer, etc. In some cases, the remote UE may belong to a group of UEs, which may share a configuration (e.g., a sidelink DRX configuration) for the power saving mode. To avoid interferences between the UEs in the group, each UE may have an offset period for when to power-ON and power-OFF indicated in the configuration. Therefore, for sidelink communications, the UEs may experience power savings as a result of supporting relay selection and discovery according to a power saving mode (e.g., using a sidelink DRX configuration for sidelink communications, as well as relay monitoring and discovery).

Aspects of the subject matter described in this disclosure may be implemented to realize one or more of the following potential improvements, among others. The techniques employed by the UEs may provide benefits and enhancements to the operation of the UEs. For example, the operations performed by the UEs may provide power saving improvements to the UE. In some examples, configuring the UEs to support sidelink DRX for relay discovery and selection may reduce power consumption by the UEs.

Aspects of the disclosure are initially described in the context of wireless communications systems. Aspects of the disclosure are further illustrated by and described with reference to apparatus diagrams, system diagrams, and flowcharts that relate to managing DRX for sidelink communications for selecting a relay device in wireless communications systems.

FIG. 1 illustrates an example of a wireless communications system 100 in accordance with one or more aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a NR network. In some examples, the wireless communications system 100 may support enhanced broadband communications, ultra-reliable (e.g., mission critical)

communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

A UE 115 may operate in a DRX mode. In some examples, the UE 115 may operate in the DRX mode based at least in part on a DRX configuration. A DRX configuration may define one or more DRX parameters, for example an active duration of a DRX cycle, an inactive duration of a DRX cycle, a DRX cycle, a periodicity of a DRX cycle, an offset period associated with an active duration of a DRX cycle, a DRX inactivity timer, a DRX activity timer, a DRX retransmission timer, etc. A DRX cycle may include an active duration of the DRX cycle and an inactive duration of the DRX cycle may be defined by a time unit of slots or milliseconds (ms).

In some examples, a DRX configuration may be per MAC entity. In some other examples, a DRX configuration may be per frequency range (FR). For example, a DRX configuration may be defined for an FR1 that may refer to frequency range between about 450 MHz and about 7.125 GHz or an FR2 that may refer to a frequency range between about 24.25 GHz and about 52.6 GHz. The UE 115 may also be configured with a DRX configuration based on providing in UE-assistance information (UAI) a preferred C-DRX configuration including a long-DRX cycle, a short-DRX cycle, a DRX inactivity timer, a short DRX cycle timer, etc. In some examples, a UE 115 might not operate in a DRX mode (e.g., a DRX mode disabled) and to experience power saving the UE 115 may wake up based on a wakeup signal received from the base stations 105.

The UEs 115 may include a UE communications manager 101 that may provide high reliability and low latency wireless communications by supporting sidelink DRX operations for relay discovery, selection, and reselection as described herein. The UE communications manager 101 may be an example of aspects of a UE communications manager as described in FIGS. 8 through 11. Similarly, the base stations 105 may include a base station communications manager 102 that may provide sidelink DRX configurations as described herein. The base station communications manager 102 may be an example of aspects of a base station communications manager as described in FIGS. 12 through 15.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
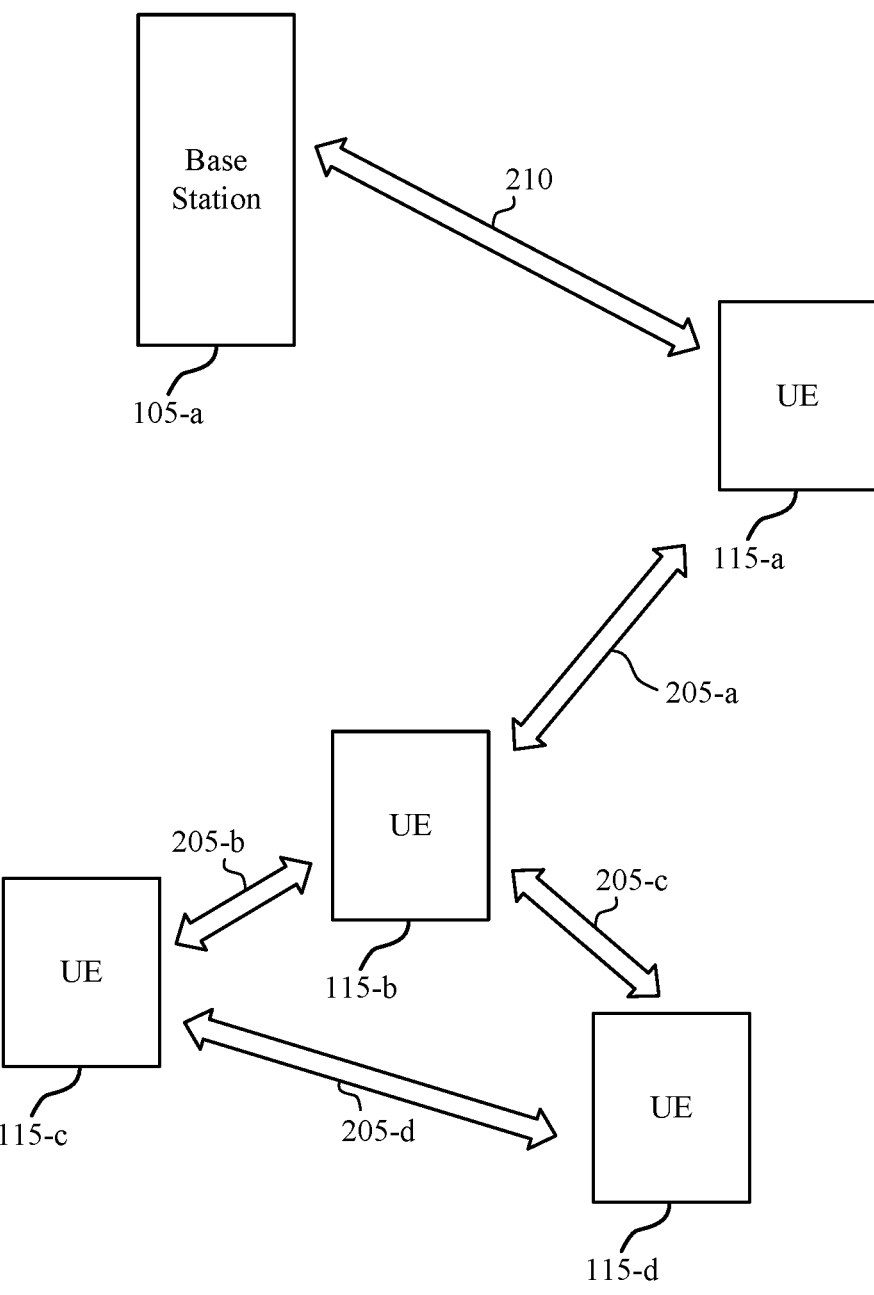

FIG. 2 illustrates an example of a wireless communications system 200 in accordance with one or more aspects of the present disclosure. The wireless communications system 200 may implement aspects of the wireless communications system 100. For example, the wireless communications system 200 may include a base station 105-*a*, a UE 115-*a*, a UE 115-*b*, a UE 115-*c*, and a UE 115-*d*, which may be examples of a base station 105 and a UE 115 as described herein. The wireless communications system 200 may support multiple radio access technologies including 4G systems such as LTE systems, LTE-A systems, or LTE-A Pro systems, and 5G systems, which may be referred to as NR systems. The wireless communications system 200 may include features for improvements to power savings and, in some examples, may promote high reliability and low latency wireless communications, among other benefits.

The wireless communications system 200 may support sidelink communications between multiple UEs 115 over sidelink connections (also referred to as D2D connections). For instance, the UE 115-*a* and the UE 115-*b* may perform sidelink communications over a sidelink connection 205-*a*. The UE 115-*a* may, additionally or alternatively, perform sidelink communications over a sidelink connection 205-*b* with the UE 115-*c* or over a sidelink connection 205-*c* with the UE 115-*d*. Similarly, the UE 115-*c* and the UE 115-*d* may perform sidelink communication over a sidelink connection 205-*d*. The sidelink connections 205 may correspond to a PC5 interface, which may facilitate sidelink communications between at least two UEs 115 without involving the base station 105-*a*. The PC5 interface may also be a one-to-many communication interface (e.g., may be specified for group communications).

In the example of FIG. 2, a UE 115 may communicate directly with the base station 105-*a* or may communicate indirectly with the base station 105-*a*. For example, the UE 115-*a* may communicate directly with the base station 105-*a* over a cellular connection 210, which may correspond to a Uu interface. The Uu interface may refer to an over-the-air interface for downlink transmissions, uplink transmissions, or both. The UE 115-*b* may communicate with the base station 105-*a* indirectly through the UE 115-*a* (also referred to as a relay UE 115-*a*). For example, the UE 115-*b* and the base station 105-*a* may be unable to communicate directly because the UE 115-*b* may be out-of-coverage for the base station 105-*a*, and hence the demand for a relay UE to relay communications (e.g., control and/or data traffic) between the UE 115-*b* and the base station 105-*a*.

The relay UE 115-*a* may be configured by the base station 105-*a* for relay services and, if configured, the relay UE 115-*a* may be provisioned with a configuration that controls relay operations. To enable such network control, the relay UE 115-*a* may indicate to the base station 105-*a* relay capabilities during a connection procedure (e.g., an attach procedure). For example, the relay UE 115-*a* may indicate resource requests for providing a relaying service and the base station 105-*a* may configure the relay UE 115-*a* with the requested resources. The base station 105-*a* may control the relay services by configuring the relay UE 115-*a* with conditions when to provide relay services to other UEs 115 in the wireless communications system 200.

The base station 105-*a* may configure a threshold, for example a reference signal received power (RSRP) threshold, a received signal received quality (RSRQ) threshold, or the like. The relay UE 115-*a* may provide relay services (e.g., function as a relay node in the wireless communications system 200) based on an RSRP or an RSRQ, or both, of a serving cell such as the base station 105-*a* satisfying an RSRP threshold or an RSRQ threshold, or both. In other words, the relay UE 115-*a* may provide relay services if an RSRP or an RSRQ, or both, associated with the cellular connection 210 (e.g., Uu link) satisfies the RSRP threshold or the RSRQ threshold, or both. Otherwise, the base station 105-*a* may prevent the UE 115-*a* from functioning (e.g., providing relay services) as a relay node in the wireless communications system 200.

The wireless communications system 200 may also provide other conditions for supporting relay discovery and selection using sidelink communications. For example, in the wireless communications system 200, the UEs 115 may support relay discovery, selection, and reselection, or a combination thereof, using sidelink communications while operating in a standalone mode for sidelink-based UE-to-network and UE-to-UE relay. The wireless communications system 200 may provide relay UE and remote UE authorization. In some examples, the relay UE 115-*a* may provide relay services (e.g., function as a relay node in the wireless communications system 200) based on a quality of service (QoS) associated with data traffic between the base station 105-*a* and the relay UE 115-*a* satisfying a QoS threshold. In the wireless communications system 200, the UEs 115 may provide relay services based on a service continuity, a security of a relayed connection (e.g., the sidelink connection 205-*a* and/or the cellular connection 210), or impact on user-plane protocol stack and control plane procedure (e.g., connection management of a relayed connection).

A UE 115 supporting sidelink communications my provide sidelink communications using a protocol stack as described herein. A remote UE 115-*b* may generate data traffic to be transmitted to the relay UE 115-*a*. This user data traffic may be packetized at an IP layer in an IP packet. The IP packet then passes down to access stratum (AS) layers. The functions of the AS layers for sidelink communications are described as follows. A packet data convergence protocol (PDCP) layer of the AS layers may support header compression of a received IP service data unit to reduce a size of an IP packet header of the IP packet. The PDCP layer may establish a sidelink radio bearer (SLRB) to carry data traffic over a sidelink (e.g., the sidelink connection 205-*a* between the remote UE 115-*b* and the relay UE 115-*a*). An RLC layer may be an unacknowledged mode (UM) radio link control (RLC) supported for the sidelink communication. The support of UM RLC for the sidelink communications may be dependent on delay-sensitive and error-tolerant traffic.

A MAC layer of the AS layers may perform logical channel prioritization by considering a priority of each sidelink logical channel corresponding to the SLRB. A MAC header may include a source ID and a destination ID field. A MAC layer at the relay UE 115-*a* may use the destination ID for packet filtering. Each MAC protocol data unit may have one new transmission and up to three retransmissions so that the relay UE 115-*a* may perform HARQ combining. A physical (PHY) layer of the AS layers may provide data transmission involving transmission of a physical control channel carrying sidelink control information (SCI), and a physical data channel. For each new transmission, the remote UE 115-*b* may transmit SCI that indicates a layer-1 destination ID, modulation and coding scheme (MCS), and time—frequency location of the data traffic. Then, the remote UE 115-*b* may transmit data traffic on the physical data channel that immediately follows the control channel.

A UE 115 that is out of coverage may be referred to herein as a remote UE 115. In the example of FIG. 2, the UE 115-*b* may be referred to as a remote UE 115-*b*. The remote UE 115-*b* may discover the relay UE 115-*a* based on discovery messages broadcasted from the remote UE 115-*b* or a discovery message received from the relay UE 115-*a*. These messages may include certain information (e.g., synchronization information, service information, etc.) that could be used by the remote UE 115-*b* or the relay UE 115-*a*, or both, to establish the sidelink connection 205-a used to relay transmissions to and from the base station 105-a, for example, to transmit and receive information related to services provided by the base station 105-a. As described herein, a relay UE may be in a connected mode. That is, the relay UE may have a connection to a network (e.g., the base station 105-a). A remote UE as described herein may operate in a connected mode, an idle mode, an inactive mode, or an out-of-coverage mode, or any combination thereof. Accordingly, a sidelink DRX for the remote UE 115-b might have to be synchronized among all remote UEs 115 and relay UEs 115. Relay UEs 115 may always be connected and thereby synchronized with the base station 105-a.

The remote UE 115-b to begin with might not be connected to any relay UEs in the wireless communications system 200 (e.g., a PC5 unicast link is not established between the remote UE 115-b and the relay UE 115-a). The remote UE 115-b may identify a presence of at least one suitable relay UE 115 to request relay service in its proximity based on the discovery messages. To enable identification, the relay UE 115-a may announce its presence by transmitting sidelink discovery messages periodically, and/ or the remote UE 115-b may announce sidelink discovery solicitation messages, expecting the relay UE 115-a, for example nearby to respond. Accordingly, for relay selection, the remote UE 115-b may might not be connected to any relay UE. The remote UE 115-b may discover all relay UEs in the wireless communications system 200 that has a sidelink RSRP, RSRQ, QoS, etc. satisfying a threshold. For relay reselection, the remote UE 115-b may be connected at least one relay UE (e.g., the relay UE 115-a). When a sidelink RSRP, RSRQ, QoS, etc. does not satisfy a threshold, the remote UE 115-b may discover other relay UEs that satisfy the threshold. For example, a remote UE may discover multiple candidate relay UEs and select one relay UE that has the highest sidelink RSRP, RSRQ, QoS, etc.

The remote UE 115-b seeking to discover a relay UE, such as the relay UE 115-a to function as a relay may, in some cases, consume considerable power while monitoring for discovery messages. The relay UE 115-a may also consume considerable power while transmitting discovery messages. As a result, a battery life of the relay UE 115-a and the remote UE 115-b may be affected, which may also impact reliability and latency of receiving information related to the services at the remote UE 115-b. In other words, without sidelink DRX operations, the relay UE 115-a and the remote UE 115-b may keep its receiver and/or transmitter continuously active to monitor and receive relay discovery messages or transmit relay discover solicitation messages in the wireless communications system 200. Various aspects of the described techniques relate to configuring the remote UE 115-b to operate in a power saving mode (also referred to as a DRX mode) to reduce its power consumption when discovering and selecting a relay UE 115 to function as a relay between the remote UE 115-b and the base station 105-a or other device in the wireless communications system 200.

While in the DRX mode, the remote UE 115-b may power-ON appropriate circuitry for some period (e.g., an active duration of a DRX cycle) to monitor a wireless channel for discovery messages from other UEs 115. After the period lapses, the remote UE 115-b may power-OFF for some other period (e.g., an inactive duration of a DRX cycle). The DRX mode including the periods for powering ON and OFF may be specific for when the remote UE 115-b monitors for discovery messages. Once the remote UE 115-b detects a candidate relay UE (e.g., the relay UE 115-a) based on the discovery messages, the remote UE 115-b may select the candidate relay to function as a relay based on a sidelink quality satisfying a threshold or that the candidate relay can provide a connectivity service requested by the remote UE 115-a as described herein.

The remote UE 115-b may evaluate the former condition by performing measurements on the discovery messages received from the candidate relay UE 115-a, and it checks the latter condition by referring to a field (e.g., a relay service code) included in the discovery messages provided by the candidate relay UE 115-a. The periods associated with the DRX mode may be configured and provided by the base station 105-a based on information provided by the remote UE 115-b. In some cases, the remote UE 115-b may belong to a group of UEs 115, which may share a sidelink configuration (e.g., sidelink DRX information) for the DRX mode. The group of UEs 115 may include the remote UE 115-b, the UE 115-c, and the UE 115-d. To avoid interferences between the UEs 115 in the group, each UE 115 may have an offset period for when to power-ON and power-OFF indicated in the sidelink DRX configuration as described herein.

The sidelink DRX configuration may be applicable for broadcast communications, groupcast communications, and unicast communications. The sidelink DRX configuration may define an active duration and an inactive duration of a DRX cycle. In some examples, the sidelink DRX configuration may provide a mechanism to align sidelink DRX active durations among the UEs 115 communicating with each other. In some other examples, the sidelink DRX configuration may provide a mechanism to align sidelink DRX active durations with Uu DRX active durations for an in-coverage UE 115.

The remote UE 115-b may while in a connected mode report its sidelink DRX preference to the base station 105-a. For example, the remote 115-b may at one time instance be within coverage of the base station 105-a and may report sidelink DRX preference to the base station 105-a. The base station 105-a may configure the remote UE 115-b with the sidelink DRX configuration, which may be a UE-specific C-DRX configuration for both cellular reception (e.g., Uu reception) and relay discovery message monitoring. Alternatively, the remote UE 115-b may while in an idle mode, an inactive mode, an out of coverage mode, or any combination thereof, may support a remote UE group common sidelink DRX configuration. The remote UE group common sidelink DRX configuration may be broadcast in a system information block (SIB) and in a pre-configuration message (e.g., an RRC pre-configuration message).

Once the remote UE 115-b detects a relay UE candidate, such as the relay UE 115-a, it selects the relay UE 115-a based on satisfying one or more criteria. For example, the remote UE 115-b may select the relay UE 115-a for relay services based on a sidelink quality of the sidelink connection 205-a satisfying a threshold. Additionally or alternatively, the remote UE 115-b may select the relay UE 115-a for relay services based on the relay UE 115-a supporting a relay or connectivity service requested by the remote UE 115-b. The remote UE 115-b may evaluate one or both criteria. During relay discovery, the remote UE 115-b may obtain a UE identifier (ID) of the relay UE 115-a to be used for sidelink transmission and reception of relayed data traffic.

In some examples, if DRX is configured, the relay UE 115-a may transmit a sidelink broadcast channel (SL-BCH) for synchronization of the remote UE 115-b. Synchronization for sidelink communications may include the relay UE 115-*a* transmitting synchronization information over the sidelink connection 205-*a* to the remote UE 115-*b*, and then, the remote UE 115-*b* becoming synchronized. The synchronization information may include a physical synchronization signal (also referred to as a sidelink synchronization signal) and an RRC message (also referred to as a master information block (MIB) sidelink). For sidelink communications including the sidelink synchronization signal, the relay UE 115-*a* in coverage uses network synchronization that is related to uplink/downlink synchronization. If the remote UE 115-*b* that is out of coverage detects suitable synchronization information transmitted by the relay UE 115-*a*, the remote UE 115-*b* may use the detected synchronization information.

The remote UE 115-*b* may selectively (e.g., conditionally) enable or disable a sidelink DRX mode or a sidelink DRX configuration. In some examples, the remote UE 115-*b* may by default enable sidelink DRX if configured in SIB or an RRC pre-configuration message. In some other examples, the remote UE 115-*b* may by default enable sidelink DRX based at least in part on a QoS of pending data traffic at the remote UE 115-*b*. For example, the remote UE 115-*b* may enable sidelink DRX if a lowest QoS of all pending data traffics is higher than a QoS threshold. Otherwise, the remote UE 115-*b* may disable sidelink DRX. Thus, when the remote UE 115-*b* has urgent data traffic, it is allowed to monitor all discovery messages, in order to reduce a latency caused by relay selection. In other examples, the remote UE 115-*b* may enable sidelink DRX based on a battery status (e.g., a battery level, a battery percentage) of the remote UE 115-*b*. Thus, the remote UE 115-*b* may enable sidelink DRX if a battery of the remote UE 115-*b* is lower than a battery threshold.

The relay UE 115-*a* may relay traffic between the sidelink connection 205-*a* (e.g., a PC5 interface) and the cellular connection 210 (e.g., a Uu interface) by performing traffic mapping. For example, the relay UE 115-*a* may map uplink/downlink bearers on sidelink bearers and vice versa, and this mapping may be used for proper packet routing and quality-of-service (QoS) treatment. For sidelink to uplink mapping, which occurs when the relay UE 115-*a* receives traffic from the remote UE 115-*b* over the sidelink connection 205-*a*, the relay UE 115-*a* uses uplink traffic flow templates to select uplink bearers to carry the received traffic over uplink. For downlink to sidelink mapping, which occurs when the relay UE 115-*a* receives traffic from the base station 105-*a* over the cellular connection 210, it identifies whether the packet has to be relayed, by referring to the destination address of the packet. The relay UE 115-*a* then assigns a priority value (also referred to as a ProSe per packet priority (PPPP)) to the received packet to be relayed.

The priority assignment may be based on the mapping information representing the association between the QoS class identifier (QCI) values of downlink bearers and the priority values. The QCI-to-priority mapping information may be provisioned to the relay UE 115-*a* by the base station 105-*a*. In some examples, the relay UE 115-*a* may distribute its discovery message transmissions though applying random resource transmission pool selection (e.g., mode2), or a base station 105-*a* distributivity schedule (e.g., model) within a DRX common active duration. This may avoid relay UEs 115 with a same relay service code from waking up at a same time. The relay UE 115-*a* may thus send more frequent discovery messages depending on its relay capability (e.g., supports high QoS bearer with the base station 105-*a* and/or the remote UE 115-*b*).

The data traffic may be unicast traffic or multicast traffic. When the relay UE 115-*a* provides relay service for unicast traffic, it establishes one-to-one sidelink connection with the remote UE 115-*a*. The PC5 signaling protocol is introduced to provide direct connection management functions such as direct link setup/release, security parameter control, and IP address allocation. In addition, this protocol can support transacting the request from the remote UE 115-*b* for multicast traffic relaying. While establishing the sidelink connection, the remote UE 115-*b* may be allocated an IP address to be used for relayed traffic. Once the relay UE 115-*a* establishes the sidelink connection 205-*a* with the remote UE 115-*b*, it reports to the base station 105-*a* the information on the remote UE 115-*b* context such as the EPS bearer ID used for relaying, remote UE ID, and optionally, the IP address. This remote UE 115-*a* context is forwarded to the base station 105-*a*, which utilizes this information for traffic management including mapping of relay traffic to the EPS bearer used for relaying.

Figure 3:
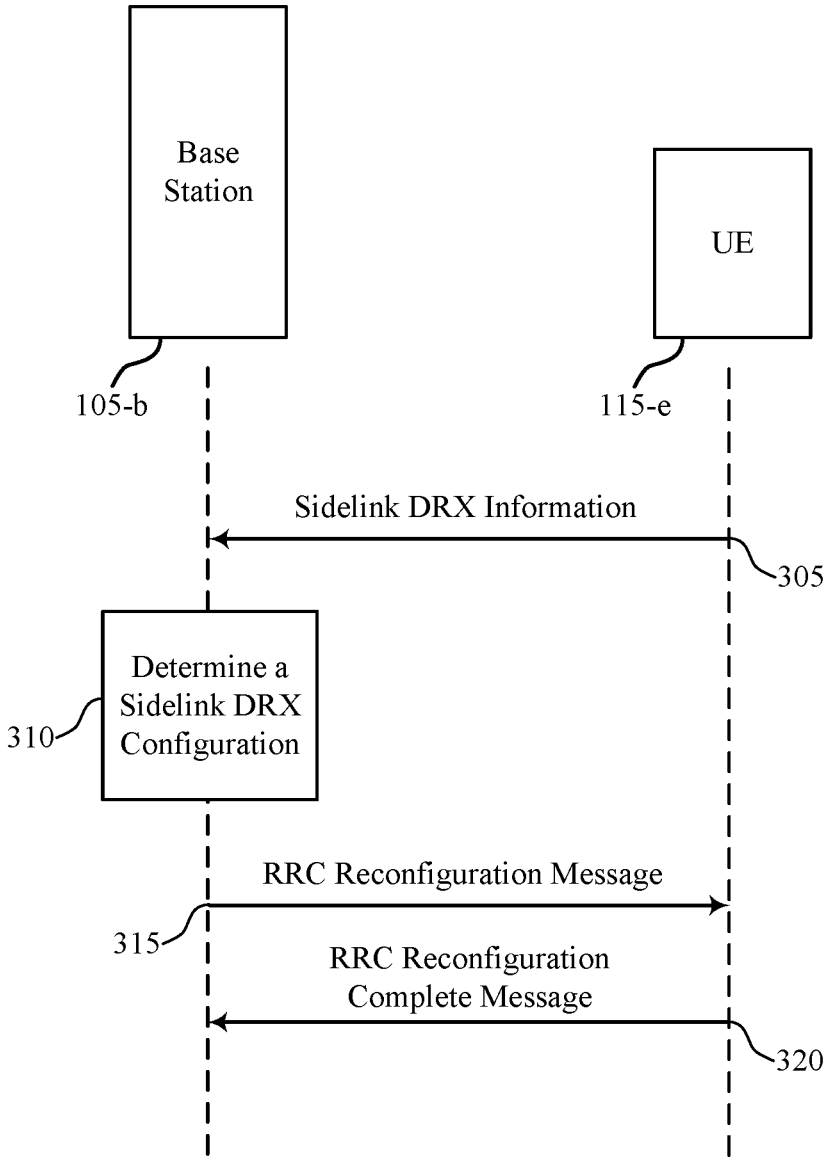
FIG. 3 illustrates an example of a process flow in accordance with one or more aspects of the present disclosure.

FIG. 3 illustrates an example of a process flow 300 in accordance with one or more aspects of the present disclosure. The process flow 300 may implement aspects of the wireless communications system 100 and 200 described with reference to FIGS. 1 and 2, respectively. The process flow 300 may be based on a configuration by a base station 105-*b* or a UE 115-*e*, and implemented by the UE 115-*e* and may promote power saving for the UE 115-*e* by supporting sidelink DRX operations. The process flow 300 may also be based on a configuration by the base station 105-*b* or the UE 115-*e*, and implemented by the UE 115-*e* to promote high reliability and low latency wireless communications by relaying the wireless communications using sidelink communications, among other benefits.

The base station 105-*b* and the UE 115-*e* may be examples of a base station 105 and a UE 115, as described with reference to FIGS. 1 and 2. In the following description of the process flow 300, the operations between the base station 105-*b* and the UE 115-*e* may be transmitted in a different order than the example order shown, or the operations performed by the base station 105-*b* and the UE 115-*e* may be performed in different orders or at different times. Some operations may also be omitted from the process flow 300, and other operations may be added to the process flow 300.

In the example of FIG. 3, the UE 115-*e* may be operating in a connected mode. That is, the UE 115-*b* may to begin with having a direct connection (e.g., via a Uu interface) with the base station 105-*b*. The UE 115-*e*, in the example of FIG. 3, may to begin with not be connected to a relay node (e.g., a relay UE) in the wireless communications system. However, later the UE 115-*e* may be out-of-coverage from the base station 105-*b* and may continue wireless communications with the base station 105-*b* using a relay UE as described herein. Various aspects of the process flow 300 relate to configuring the UE 115-*e* to operate in a power saving mode (also referred to as a sidelink DRX mode or a C-DRX mode) to reduce its power consumption when monitoring a wireless communications system for discovering and selecting a relay UE to function as a relay between the UE 115-*e* and the base station 105-*b*.

At 305, the UE 115-*e* may transmit sidelink DRX information to the base station 105-*b*, for example, via a Uu interface. The UE 115-*e* may transmit the sidelink DRX information in UE-assistance information (UAI). The sidelink DRX information may indicate a DRX preference, which may include a DRX cycle, an active duration of a DRX cycle, an offset period prior to the active duration of the DRX cycle, a DRX inactivity timer, a DRX retransmission timer, etc. The UE 115-*b* may thereby report its preference for sidelink DRX operations to the base station 105-*b* via the sidelink DRX information. The UE 115-*e* may determine the DRX preference based at least in part on a relay service or QoS requirements of pending data traffic at the UE 115-*e*, or both.

At 310, the base station 105-*b* may determine a sidelink DRX configuration, for example, based on the received sidelink DRX information from the UE 115-*e*. The sidelink DRX configuration may define a DRX pattern including an active duration of a DRX cycle and an inactive duration of a DRX cycle. The base station 105-*b* may configure a UE-specific DRX pattern for the UE 115-*e* via Uu RRC messages. That is, the base station 105-*b* may configure a single DRX pattern for the UE 115-*b* for both cellular communications (e.g., Uu reception/transmission) and relay discovery monitoring and selection (e.g., via PC5 interface). In some examples, the base station 105-*b* may determine the sidelink DRX configuration or adjust the sidelink DRX configuration via RRC messages to modify the sidelink DRX configuration. Because the base station 105-*a* may know a discovery resource pool configuration of the UE 115-*e*, it can modify or configure the sidelink DRX configuration (e.g., a C-DRX) to account for overlap with the discovery resource pool configuration during a DRX cycle (e.g., a C-DRX ON periods).

At 315, the base station 105-*b* may transmit an RRC reconfiguration message including the sidelink DRX configuration to the UE 115-*e*. At 320, the UE 115-*e* may transmit an RRC reconfiguration complete message to the base station 105-*e*. Additionally or alternatively, the base station 105-*b* may, in some examples, determine multiple DRX patterns (e.g., multiple C-DRX patterns) for the UE 115-*e*. One DRX pattern may be for Uu reception and another DRX pattern may be for relay discovery monitoring. The base station 105-*b* may transmit the multiple DRX patterns in a single RRC reconfiguration message or separate RRC reconfiguration messages.

Figure 4:
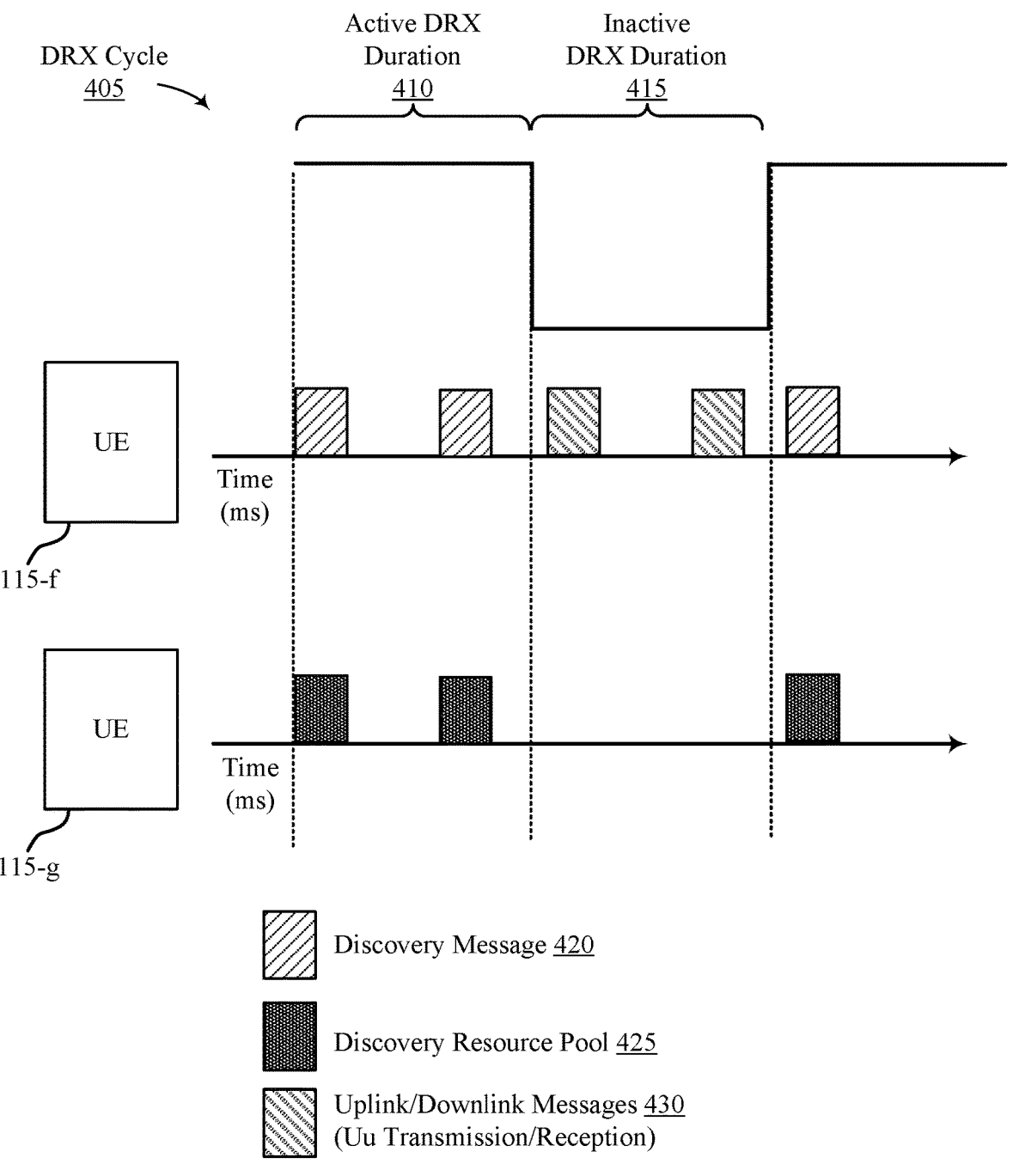
FIGS. 4 through 7 illustrates examples of timelines in accordance with one or more aspects of the present disclosure.

FIG. 4 illustrates an example of a timeline 400 in accordance with one or more aspects of the present disclosure. The timeline 400 may implement aspects of the wireless communications system 100 and 200 described with reference to FIGS. 1 and 2, respectively. The timeline 400 may be based on a configuration by a base station 105 or a UE 115, and implemented by the UE 115 to decrease power consumption for the UE 115 by supporting sidelink DRX operations. The timeline 400 may also be based on a configuration by the base station 105 or the UE 115, and implemented by the UE 115 to promote high reliability and low latency wireless communications in a wireless communications system, among other benefits.

With reference to the timeline 400, a relay UE 115-*f* or a remote UE 115-*g*, or both, as described herein may operate according to a sidelink DRX configuration. The sidelink DRX configuration may define a DRX cycle 405, which may include an active DRX duration 410 and an inactive DRX duration 415. During the active DRX duration 410, the relay UE 115-*f* may broadcast one or more discovery messages 420 over a sidelink channel. The remote UE 115-*g* may monitor a discovery resource pool 425 for the one or more broadcasted discovery messages 420 during the active DRX duration 410.

A resource pool may be a reception resource pool or a transmission resource pool, or a combination thereof. These may be either signaled by a base station 105 for an in coverage case, or preconfigured for an out-of-coverage case. In the example of FIG. 4, the discovery resource pool 425 may be a reception resource pool. The discovery resource pool 425 may be a set of time and frequency resources assigned to the remote UE 115-*g* for sidelink operations, and more specifically for monitoring the discovery messages 420.

The relay UE 115-*f* may also support cellular communications (e.g., via Uu interface) during the inactive DRX duration 415 of the DRX cycle 405. For example, the relay UE 115-*f* may support cellular (Uu interface) transmissions and receptions (e.g., uplink/downlink messages 430) to and from a base station 105 via a Uu interface. As illustrated in FIG. 4, the remote UE 115-*g* might not perform any operations (e.g., channel monitoring for discovery messages, etc.) during the inactive DRX duration 415 of the DRX cycle 405. The remote UE 115-*g* may thereby experience added power savings for relay discovery monitoring by disabling monitoring for the one or more discovery messages 420 during the inactive DRX duration 415 of the DRX cycle 405.

Figure 5:
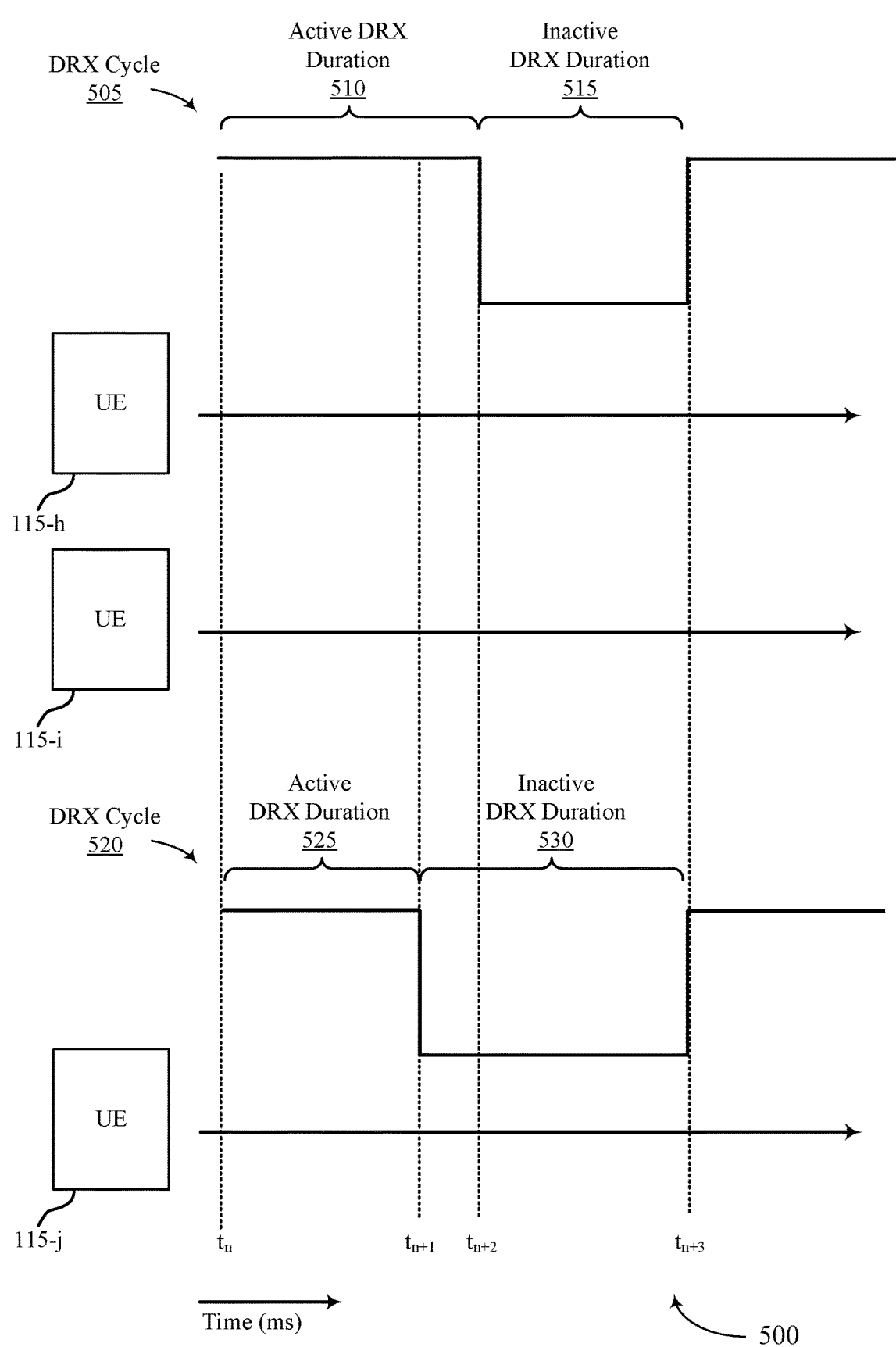

FIG. 5 illustrates an example of a timeline 500 in accordance with one or more aspects of the present disclosure. The timeline 500 may implement aspects of the wireless communications system 100 and 200 described with reference to FIGS. 1 and 2, respectively. The timeline 500 may be based on a configuration by a base station 105 or a UE 115, and implemented by the UE 115 to decrease power consumption for the UE 115 by supporting sidelink DRX operations. The timeline 500 may also be based on a configuration by the base station 105 or the UE 115, and implemented by the UE 115 to promote high reliability and low latency wireless communications in a wireless communications system, among other benefits.

With reference to the timeline 500, one or more of the remote UEs 115 may receive a common sidelink DRX configurations in a system information message (e.g., a SIB) or an RRC message (e.g., an RRC reconfiguration message). For example, a base station 105 may broadcast the system information message (e.g., a SIB) or the RRC message (e.g., an RRC reconfiguration message) to one or more of the remote UEs 115. One or more of the remote UEs 115 might not have a PC5 unicast link with a relay UE established, and one or more of the remote UEs 115 may be operating in an idle mode, an inactive mode, or an out-of-coverage mode, or a combination thereof. As such, one or more of the remote UEs 115 may be configured with a common sidelink DRX configurations for power saving when monitoring for discovery messages from a candidate relay UE.

For example, a remote UE 115-*h* and a remote UE 115-*i* as described herein may operate according to a common sidelink DRX configuration. The remote UE 115-*h* and the remote UE 115-*i* may be grouped into a same group of UEs based at least in part on a pathloss parameter to a base station 105 for each of the remote UE 115-*h* and the remote UE 115-*i* or a QoS of pending data traffic for each of the remote UE 115-*h* and the remote UE 115-*i*, or both. The common sidelink DRX configuration may define a DRX cycle 505, which may include an active DRX duration 510 and an inactive DRX duration 515. The DRX cycle 505 may be a common DRX cycle for the remote UE 115-*h* and the remote UE 115-*i*. As such, the active DRX duration 510 may be a common active DRX duration for the remote UE 115-*h* and the remote UE 115-*i*. Likewise, the inactive DRX duration 515 may be a common inactive DRX duration for the remote UE 115-*h* and the remote UE 115-*i*.

Alternatively, a remote UE 115-*j*, as described herein, may operate according to a common sidelink DRX configuration different from the common sidelink DRX configuration associated with the remote UE 115-*h* and the remote UE 115-*i*. This common sidelink DRX configuration may define a DRX cycle 520, which may include an active DRX duration 525 and an inactive DRX duration 530. To avoid interference between the different groups of UEs 115, the common sidelink DRX configuration may include different group common DRX periodicity, different group common active DRX durations, different group common DRX offset periods, different monitoring durations (e.g., a duration length may be group common but without offset), etc. That is, the remote UEs 115 belonging to different groups of UEs may perform operations (e.g., monitoring a sidelink channel for discovery messages) based on different sidelink DRX configurations.

In the example of FIG. 5, the active DRX duration 510 associated with the DRX cycle 505 may begin at $t_n$ and the active DRX duration 525 associated with the DRX cycle 520 may begin at $t_n$. However, the active DRX duration 510 may end at $t_{n+2}$ while the active DRX duration 525 ends at $t_{n+1}$. The inactive DRX duration 515 associated with the DRX cycle 505 may begin at $t_{n+2}$ while the inactive DRX duration 530 associated with the DRX cycle 520 may begin at $t_{n+1}$. In the example of FIG. 5, both the inactive DRX duration 515 associated with the DRX cycle 505 and the inactive DRX duration 530 associated with the DRX cycle 520 may end at $t_{n+3}$. The active DRX durations and inactive DRX durations may thus have different lengths for the different sidelink DRX configurations to avoid interference, as well as to provide opportunity for the remote UEs 115 to monitor for discovery messages. In addition, the remote UEs 115 may experience added power savings for relay discovery monitoring by disabling monitoring for discovery messages during the inactive DRX durations of the DRX cycles.

Figure 6:

FIG. 6 illustrates an example of a timeline 600 in accordance with one or more aspects of the present disclosure. The timeline 600 may implement aspects of the wireless communications system 100 and 200 described with reference to FIGS. 1 and 2, respectively. The timeline 600 may be based on a configuration by a base station 105 or a UE 115, and implemented by the UE 115 to decrease power consumption for the UE 115 by supporting sidelink DRX operations. The timeline 600 may also be based on a configuration by the base station 105 or the UE 115, and implemented by the UE 115 to promote high reliability and low latency wireless communications in a wireless communications system, among other benefits.

With reference to the timeline 600, one or more of the remote UEs 115 may receive a common sidelink DRX configurations in a system information message (e.g., a SIB) or an RRC message (e.g., an RRC reconfiguration message). For example, a base station 105 may broadcast the system information message (e.g., a SIB) or the RRC message (e.g., an RRC reconfiguration message) to one or more of the remote UEs 115. A remote UE 115-l and a remote UE 115-m as described herein may operate according to a common sidelink DRX configuration. The remote UE 115-l and the remote UE 115-m may be grouped into a same group of UEs based at least in part on one or more parameters (e.g., a pathloss, a QoS of pending data traffic, etc.) as described herein. In some examples, as described herein, the common active DRX duration may be configured to overlap with a discovery resource pool that may be configured for one or both a first model discovery procedure (e.g., announcement messages) or a second model discovery procedure (e.g., sonication and response messages).

The common sidelink DRX configuration may define a DRX cycle 605, which may include an active DRX duration 610 and an inactive DRX duration 615. The DRX cycle 605 may be a common DRX cycle for the remote UE 115-l and the remote UE 115-m. As such, the active DRX duration 610 may be a common active DRX duration for the remote UE 115-l and the remote UE 115-m. Likewise, the inactive DRX duration 615 may be a common inactive DRX duration for the remote UE 115-l and the remote UE 115-m. To avoid interference between the remote UE 115-l and the remote UE 115-m belonging to a same group of UEs, the common sidelink DRX configuration may define a monitoring duration for each of the remote UE 115-l and the remote UE 115-m, as well as an offset duration for one or both of the remote UE 115-l and the remote UE 115-m. That is, to avoid waking up at the same time, the different UEs 115-l, UE 115-m may have UE-specific DRX monitoring offsets via a random offset or a mapping with remote UE source L2 ID as input (e.g., similar to paging PO calculation).

The remote UE 115-l may monitor a sidelink channel for one or more discovery messages 620 from a relay UE 115-k during a monitor duration 630 of the active DRX duration 610 associated with the DRX cycle 605. The monitor duration 630 may begin at $t_n$. Similarly, the remote UE 115-m may monitor a sidelink channel for one or more discovery messages 620 from the relay UE 115-k during a monitor duration 635 of the active DRX duration 610 associated with the DRX cycle 605. The monitor duration 630 may begin at $t_{n+1}$ and end at $t_{n+2}$, for example when the inactive DRX duration 615 begins. As such, each of the remote UE 115-l and the remote UE 115-m may have a portion of the active DRX duration allocated to monitor for discovery messages from the relay UE 115-k. Additionally, the monitor duration 635 may begin after an offset duration 640 that spans from $t_n$ to $t_{n+1}$. Thus, the remote UEs 115 may perform operations (e.g., monitoring a sidelink channel for discovery messages) based on different monitor durations indicated in the sidelink DRX configuration.

The remote UE 115-l may be configured to stop monitoring all reception resource pools outside the monitoring duration 630. Likewise, the remote UE 115-m may be configured to stop monitoring all reception resource pools outside the monitoring duration 635. The remote UE 115-l may be configured to stop monitoring all reception resource discovery pools if separate discovery and common pools are configured for the remote UEs 115. Similarly, the remote UE 115-m may be configured to stop monitoring all reception resource discovery pools if separate discovery and common pools are configured for the remote UEs 115. This may be suitable for the case where the UEs 115 have another PC5 unicast link setup for normal PC5 operation. A power consumption difference: discovery is groupcast and broadcast and takes max transmit power, while common message can use open and close loop power control. The discovery messages may be periodic and the UEs 115 may adapt to a DRX pattern, while common messages may be bursty. The remote UEs 115-l, 115-m may determine to stop monitoring all reception resource pools including reception resource discovery pools outside the monitoring durations 630, 635 based on an indication in a SIB or an RRC pre-configuration message.

The relay UE 115-k may also support cellular communications (e.g., via Uu interface) during the inactive DRX duration 615 of the DRX cycle 605. For example, the relay UE 115-k may support cellular (Uu interface) transmissions and receptions (e.g., uplink/downlink messages 625) to and from a base station 105 via a Uu interface. As illustrated in FIG. 6, the remote UEs 115-l, UE 115-m might not perform any operations (e.g., channel monitoring for discovery messages, etc.) during the inactive DRX duration 615 of the DRX cycle 605. The remote UEs 115-l, 115-m may thereby experience added power savings for relay discovery monitoring by disabling monitoring for the one or more discovery messages 620 during the inactive DRX duration 615 of the DRX cycle 605. The inactive DRX duration 615 of the DRX cycle 605 may also provide power savings for the relay UE 115-*k* by avoiding sending discovery messages during the inactive DRX duration 615 and performing other wireless operations (e.g., uplink/downlink transmission/reception). That is, the relay UE 115-*k* may perform discontinuous transmission (i.e. turn OFF its transmitter) because it knows the DRX cycle 605 of the remote UEs 115-*l*, 115-*m*. In some examples, the relay UE 115-*k* may transmit some relay discovery message within a DRX common inactive duration, for a remote UE 115 with pending urgent data traffic. The relay UE 115 may alternatively perform Uu transmission/reception within a DRX common inactive duration.

Figure 7:
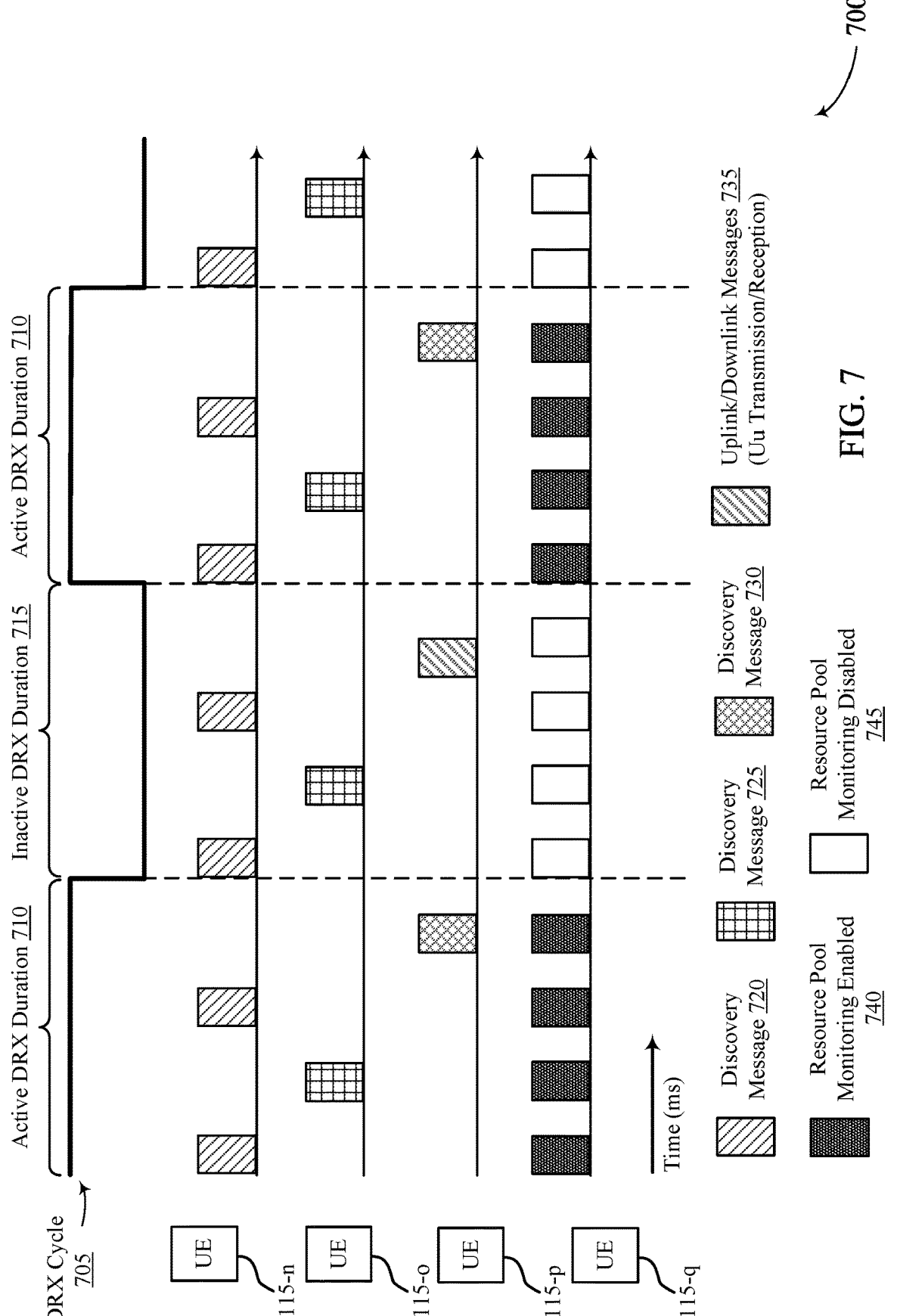

FIG. 7 illustrates an example of a timeline 700 in accordance with one or more aspects of the present disclosure. The timeline 700 may implement aspects of the wireless communications system 100 and 200 described with reference to FIGS. 1 and 2, respectively. The timeline 700 may be based on a configuration by a base station 105 or a UE 115, and implemented by the UE 115 to decrease power consumption for the UE 115 by supporting sidelink DRX operations. The timeline 700 may also be based on a configuration by the base station 105 or the UE 115, and implemented by the UE 115 to promote high reliability and low latency wireless communications in a wireless communications system, among other benefits. In the example of FIG. 7, a single group of UEs 115 may include one or more relay UEs 115 and a remote UE. The group of UEs may share a same active DRX duration of a DRX cycle. The remote UE's monitoring window may be the same as a DRX common ON duration.

With reference to the timeline 700, a relay UE 115-*n*, a relay UE 115-*o*, a relay UE 115-*p* or a remote UE 115-*q*, or any combination thereof, as described herein may operate according to a sidelink DRX configuration. The sidelink DRX configuration may define a DRX cycle 705, which may include one or more active DRX durations 710 and an inactive DRX duration 715. In some examples, during the active DRX duration 710, the relay UE 115-*n* may broadcast one or more discovery messages 720 over a sidelink channel. In some other examples, during the active DRX duration 710, the relay UE 115-*o* may broadcast one or more discovery messages 725 over a sidelink channel. In other examples, the relay UE 115-*p* may broadcast one or more discovery messages 730 over a sidelink channel. One or more of the relay UE 115-*n*, the relay UE 115-*o*, and the relay UE 115-*p* may distribute the discovery message transmissions though applying random resource transmission pool selection (e.g., mode2), or a base station 105 may distributivity schedule (e.g., model) the discovery message transmissions for the relay UEs 115. This may avoid the relay UEs 115 with a same relay service code from waking up at a same time and causing interference to each other.

The remote UE 115-*q* may monitor a discovery resource pool for the one or more broadcasted discovery messages 720, 725, and 730 during the active DRX duration 410. A resource pool may be a reception resource pool or a transmission resource pool, or a combination thereof. These may be either signaled by a base station 105 for an in coverage case, or preconfigured for an out-of-coverage case. In the example of FIG. 7, the remote UE 115-*q* may enable resource pool monitoring 740 during the active DRX duration 710, and disable the resource pool monitoring 745 during the inactive DRX duration 715. The discovery resource pool 425 may be a reception resource pool. The discovery resource pools as illustrated in FIG. 7 may be a set of time and frequency resources assigned to the remote UE 115-*q* for sidelink operations, and more specifically for monitoring one or more sidelink channels for the one or more discovery messages 720, 725, and 730.

As illustrated in FIG. 7, the remote UE 115-*q* might not perform any operations (e.g., channel monitoring for discovery messages, etc.) during the inactive DRX duration 715 of the DRX cycle 705. The remote UE 115-*q* may thereby experience added power savings for relay discovery monitoring by disabling monitoring for the one or more discovery messages 720, 725, and 730 during the inactive DRX duration 715 of the DRX cycle 705. One or more of the relay UE 115-*n*, the relay UE 115-*o*, and the relay UE 115-*p* may also support cellular communications (e.g., via Uu interface) during the inactive DRX duration 715 of the DRX cycle 705. For example, the relay UE 115-*p* may support cellular (Uu interface) transmissions and receptions (e.g., uplink/downlink messages 735) to and from a base station 105 via a Uu interface. One or more of the relay UE 115-*n*, the relay UE 115-*o*, and the relay UE 115-*p* may also experience power savings by avoiding sending discovery messages during the inactive DRX duration 715 and performing other wireless operations (e.g., uplink/downlink transmission/reception).

Figure 8:
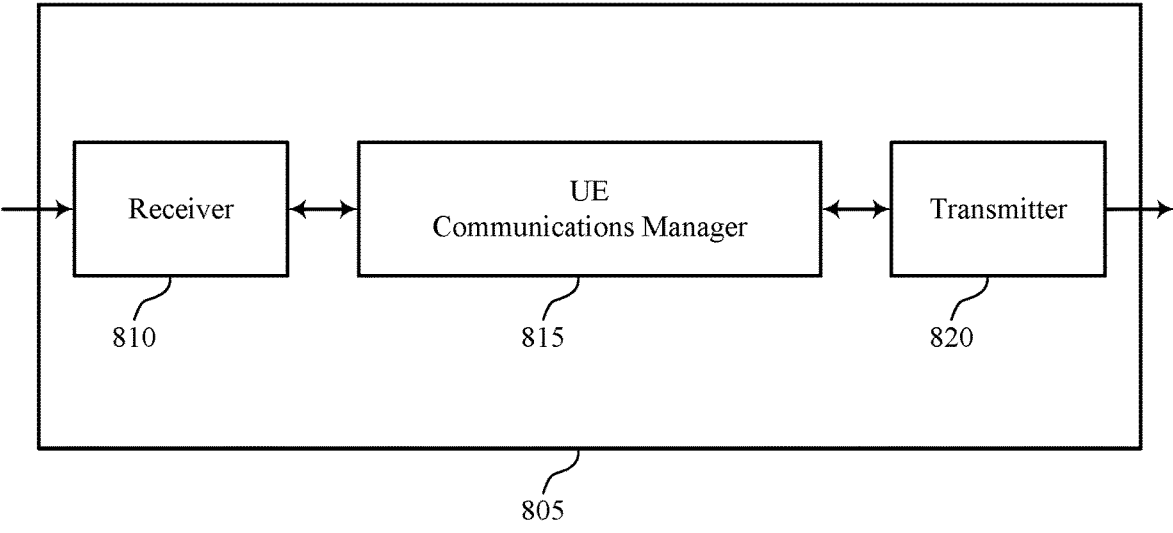
FIGS. 8 and 9 show block diagrams of devices in accordance with one or more aspects of the present disclosure.

FIG. 8 shows a block diagram 800 of a device 805 in accordance with one or more aspects of the present disclosure. The device 805 may be an example of aspects of a UE 115 as described herein. The device 805 may include a receiver 810, a UE communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to DRX for sidelink communications in wireless communications systems, etc.). Information may be passed on to other components of the device 805. The receiver 810 may be an example of aspects of the transceiver 1120 described with reference to FIG. 11. The receiver 810 may utilize a single antenna or a set of antennas.

The UE communications manager 815 may transmit sidelink DRX information to a base station while operating in a connected mode, receive a message including a sidelink DRX configuration from the base station based on the sidelink DRX information, and operate according to the sidelink DRX configuration.

The UE communications manager 815 may also receive a message including a group sidelink DRX configuration associated with a group of UEs while operating in an out-of-coverage mode, an idle mode, or an inactive mode, determine a temporal period to enable discontinuous monitoring of a sidelink channel based on the group sidelink DRX configuration, and monitor the sidelink channel during the temporal period.

The UE communications manager 815 may also determine a DRX cycle based on a sidelink DRX configuration, the DRX cycle including an active duration and an inactive duration, receive a discovery request message from a second UE during the active duration of the DRX cycle, and transmit a discovery response message to a second UE during the active duration of the DRX cycle. The UE communications manager 815 may be an example of aspects of the UE communications manager 1110 described herein.

The UE communications manager 815, or its sub-components, may be implemented in hardware, code (e.g., software or firmware) executed by a processor, or any combination thereof. If implemented in code executed by a processor, the functions of the UE communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 815, or its sub-components, may be physically located at various positions, including being distributed such that portions of functions are implemented at different physical locations by one or more physical components. In some examples, the UE communications manager 815, or its sub-components, may be a separate and distinct component in accordance with various aspects of the present disclosure. In some examples, the UE communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
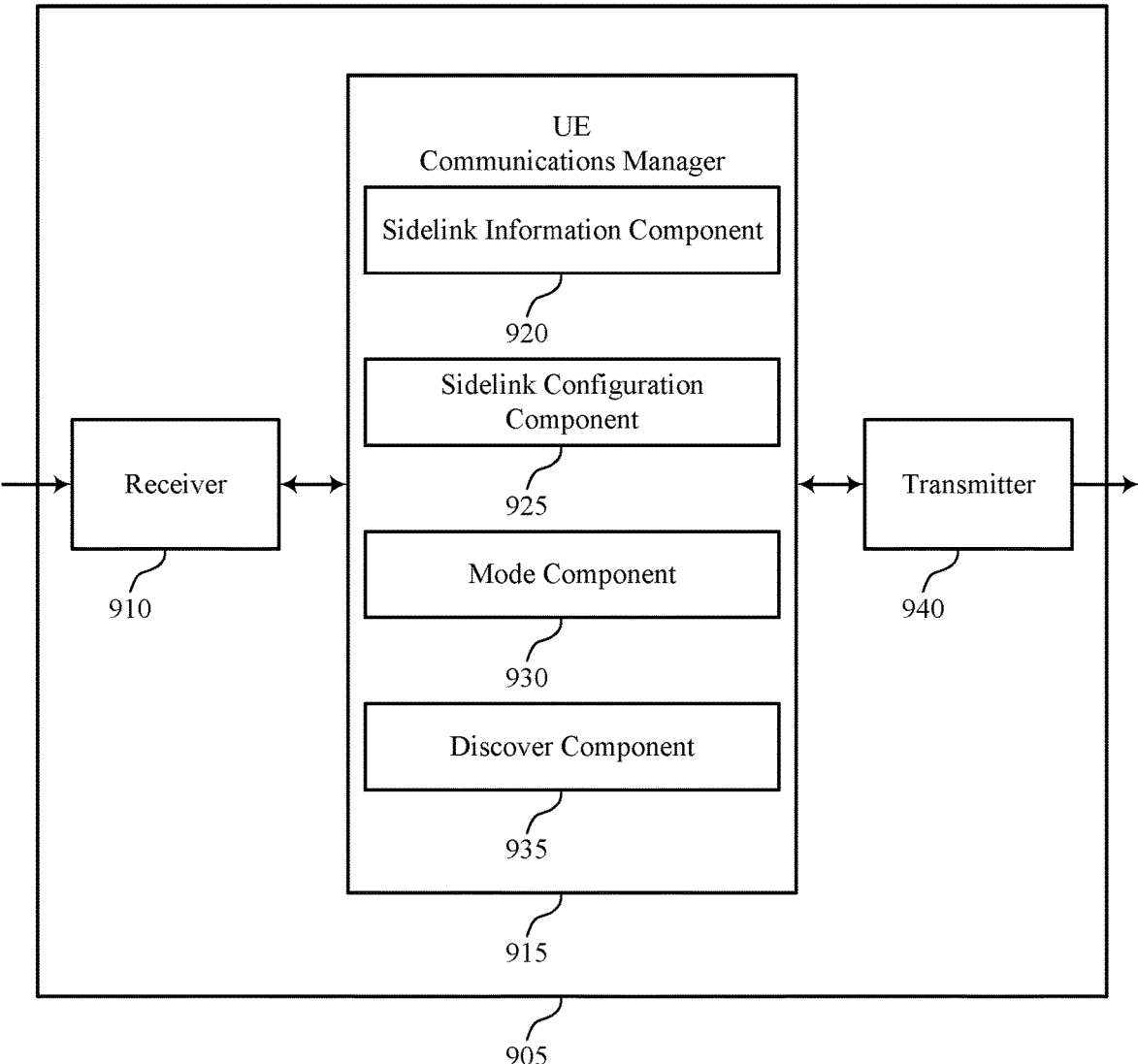

FIG. 9 shows a block diagram 900 of a device 905 in accordance with one or more aspects of the present disclosure. The device 905 may be an example of aspects of a device 805, or a UE 115 as described herein. The device 905 may include a receiver 910, a UE communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to DRX for sidelink communications in wireless communications systems, etc.). Information may be passed on to other components of the device 905. The receiver 910 may be an example of aspects of the transceiver 1120 described with reference to FIG. 11. The receiver 910 may utilize a single antenna or a set of antennas.

The UE communications manager 915 may be an example of aspects of the UE communications manager 815 as described herein. The UE communications manager 915 may include a sidelink information component 920, a sidelink configuration component 925, a mode component 930, and a discover component 935. The UE communications manager 915 may be an example of aspects of the UE communications manager 1110 described herein.

The sidelink information component 920 may transmit sidelink DRX information to a base station while operating in a connected mode. The sidelink configuration component 925 may receive a message including a sidelink DRX configuration from the base station based on the sidelink DRX information. The mode component 930 may operate according to the sidelink DRX configuration.

The sidelink configuration component 925 may receive a message including a group sidelink DRX configuration associated with a group of UEs while operating in an out-of-coverage mode, an idle mode, or an inactive mode. The mode component 930 may determine a temporal period to enable discontinuous monitoring of a sidelink channel based on the group sidelink DRX configuration and monitor the sidelink channel during the temporal period.

The sidelink configuration component 925 may determine a DRX cycle based on a sidelink DRX configuration, the DRX cycle including an active duration and an inactive duration. The discover component 935 may receive a discovery request message from a second UE during the active duration of the DRX cycle and transmit a discovery response message to a second UE during the active duration of the DRX cycle.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
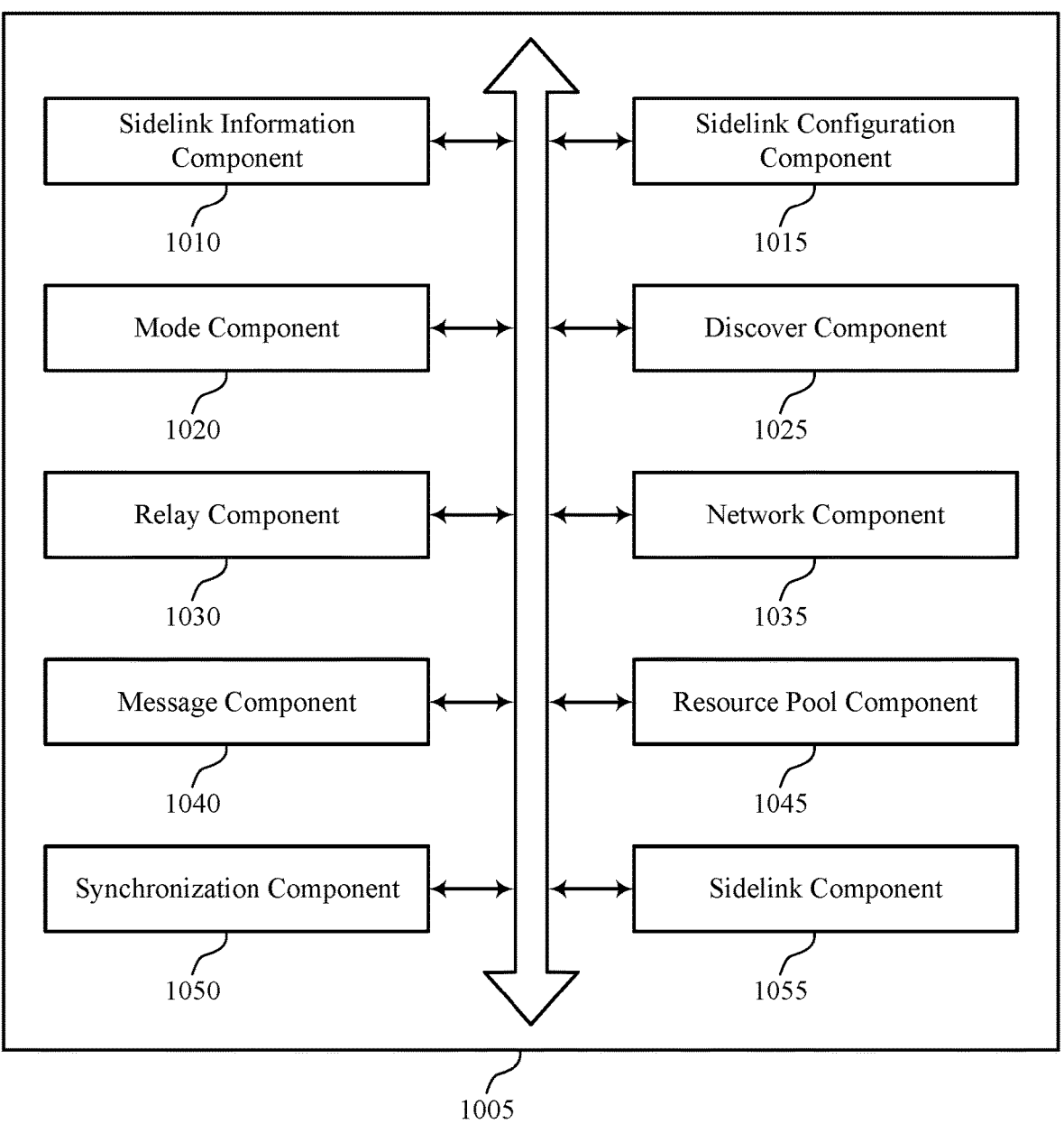
FIG. 10 shows a block diagram of a UE communications manager in accordance with one or more aspects of the present disclosure.

FIG. 10 shows a block diagram 1000 of a UE communications manager 1005 in accordance with one or more aspects of the present disclosure. The UE communications manager 1005 may be an example of aspects of a UE communications manager 815, a UE communications manager 915, or a UE communications manager 1110 described herein. The UE communications manager 1005 may include a sidelink information component 1010, a sidelink configuration component 1015, a mode component 1020, a discover component 1025, a relay component 1030, a network component 1035, a message component 1040, a resource pool component 1045, a synchronization component 1050, and a sidelink component 1055. Each of these modules may communicate, directly or indirectly, with one another (e.g., via one or more buses).

The sidelink information component 1010 may transmit sidelink DRX information to a base station while operating in a connected mode. In some examples, the sidelink information component 1010 may include the sidelink DRX information in UAI. In some examples, the sidelink information component 1010 may transmit the UAI including the sidelink DRX information to the base station while operating in the connected mode, where receiving the message including the sidelink DRX configuration is based on the UAI.

The sidelink configuration component 1015 may receive a message including a sidelink DRX configuration from the base station based on the sidelink DRX information. In some examples, the sidelink configuration component 1015 may receive a message including a group sidelink DRX configuration associated with a group of UEs while operating in an out-of-coverage mode, an idle mode, or an inactive mode. In some examples, the sidelink configuration component 1015 may determine a DRX cycle based on a sidelink DRX configuration, the DRX cycle including an active duration and an inactive duration. In some examples, the sidelink configuration component 1015 may receive a SIB or an RRC reconfiguration message including the group sidelink DRX configuration. In some examples, the sidelink configuration component 1015 may enable discontinuous monitoring of the sidelink channel based on the SIB or the RRC reconfiguration message.

In some examples, the sidelink configuration component 1015 may disable a DRX mode based on a QoS associated with pending data traffic satisfying a QoS threshold. In some cases, the sidelink DRX configuration includes a connected mode DRX configuration. In some cases, the sidelink DRX configuration includes a sidelink DRX preference associated with a discovery procedure including a first model discovery procedure or a second model discovery procedure. In some cases, the sidelink DRX configuration includes a sidelink DRX preference associated with receiving a downlink signal from the base station or transmitting an uplink signal to the base station, or both. In some cases, the UE includes a remote UE and a second UE includes a relay UE between the remote UE and the base station. In some cases, the group sidelink DRX configuration includes a DRX periodicity common to the group of UEs.

In some cases, the sidelink DRX configuration includes an active duration of a DRX cycle common to the group of UEs. In some cases, the sidelink DRX configuration includes a group offset duration between a beginning of a DRX cycle and an active duration of the DRX cycle, where the group offset duration is common to the group of UEs. In some cases, the UE is grouped in the group of UEs based on a pathloss parameter. In some cases, the UE is grouped in the group of UEs based on a QoS associated with data traffic of the UE. In some cases, the sidelink DRX configuration is based on a discovery resource pool corresponding to time and frequency resources for receiving the discovery request message or transmitting the discovery response message, or both.

The mode component 1020 may operate according to the sidelink DRX configuration. In some examples, the mode component 1020 may determine a temporal period to enable discontinuous monitoring of a sidelink channel based on the group sidelink DRX configuration. In some examples, the mode component 1020 may monitor the sidelink channel during the temporal period. In some examples, the mode component 1020 may determine a single connected mode DRX cycle for sidelink communications or cellular communications, or both, based on the sidelink DRX configuration. In some examples, the mode component 1020 may where operating according to the sidelink DRX configuration is based on the single connected mode DRX cycle. In some examples, determining a DRX cycle based on a relay service associated with a second UE or a QoS associated with data traffic for the UE, or both, where the sidelink DRX information includes an indication of the DRX cycle.

In some examples, the mode component 1020 may determine a value of an activity timer associated with a DRX cycle based on a relay service associated with a second UE or a QoS associated with data traffic for the UE, or both, where the sidelink DRX information includes an indication of the value of the activity timer associated with the DRX cycle. In some examples, the mode component 1020 may determine a value of an inactivity timer associated with a DRX cycle based on a relay service associated with a second UE or a QoS associated with data traffic for the UE, or both, where the sidelink DRX information includes an indication of the value of the inactivity timer associated with the DRX cycle.

In some examples, determining an offset between a beginning of a DRX cycle and a beginning of an active duration of the DRX cycle based on a relay service associated with a second UE or a QoS associated with data traffic for the UE, or both, where the sidelink DRX information includes an indication of the offset. In some examples, the mode component 1020 may determine a first sidelink DRX pattern associated with the sidelink DRX configuration for monitoring a sidelink channel to receive a discovery signal based on the sidelink DRX configuration. In some examples, the mode component 1020 may determine a second sidelink DRX pattern associated with the sidelink DRX configuration for receiving a downlink signal from the base station or transmitting an uplink signal to the base station, or both, based on the sidelink DRX configuration, where the first sidelink DRX pattern is different from the second sidelink DRX pattern.

In some examples, determining a UE-specific offset duration associated with an active duration of a DRX cycle based on the sidelink DRX configuration, where monitoring the sidelink channel includes. In some examples, the mode component 1020 may enable a DRX mode based on the message. In some examples, the mode component 1020 may enable a DRX mode based on a QoS associated with pending data traffic satisfying a QoS threshold. In some examples, the mode component 1020 may enable a DRX mode based on a power level of the UE satisfying a power level threshold. In some cases, the sidelink DRX configuration includes a first indication of the first sidelink DRX pattern or a second indication of the second sidelink DRX pattern, or both. In some cases, the temporal period is common to the group of UEs. In some cases, the UE-specific offset duration is based on a L2 identifier associated with the UE.

The discover component 1025 may receive a discovery request message from a second UE during the active duration of the DRX cycle. In some examples, the discover component 1025 may transmit a discovery response message to a second UE during the active duration of the DRX cycle. In some examples, the discover component 1025 may monitor a sidelink channel to receive a discovery signal from a second UE during an active duration of a DRX cycle based on the sidelink DRX configuration. In some examples, the discover component 1025 may receive the discovery signal from the second UE based on the monitoring. In some examples, the discover component 1025 may broadcast a discovery request message during the active duration of the DRX cycle based on the sidelink DRX configuration.

In some examples, the discover component 1025 may monitor the sidelink channel to receive a discovery response message from the second UE during the active duration of the DRX cycle. In some examples, the discover component 1025 may receive the discovery response message from the second UE based on the monitoring, the discovery signal including the discovery response message. In some examples, the discover component 1025 may determine, based on the sidelink DRX configuration, a sidelink DRX pattern for monitoring the sidelink channel to receive the discovery signal from the second UE, the sidelink DRX pattern including the DRX cycle including the active duration and an inactive duration. In some examples, the discover component 1025 may broadcast a discovery request message during an inactive duration of a DRX cycle associated with the group of UEs based on a data traffic condition for the UE, where the inactive duration is common to the group of UEs, where the inactive duration and the DRX cycle are common to the group of UEs. In some cases, the sidelink DRX configuration is based on a discovery resource pool corresponding to time and frequency resources associated with monitoring the sidelink channel to receive the discovery signal from the second UE.

The relay component 1030 may select the second UE for relay communications between the UE and the base station, or between the UE and a third UE, or both, based on the discovery signal, where the relay communications correspond to a L2 forwarding function or a L3 forwarding function. In some examples, the relay component 1030 may receive a synchronization signal from the second UE on a sidelink broadcast channel. In some examples, the relay component 1030 may synchronize with the second UE based on the synchronization signal.

The network component 1035 may receive a downlink signal from the base station using a cellular link based on the sidelink DRX configuration. In some examples, the network component 1035 may transmit an uplink signal to the base station using the cellular link based on the sidelink DRX configuration. In some examples, the network component 1035 may determine, based on the sidelink DRX configuration, a sidelink DRX pattern for receiving the downlink signal or transmitting the uplink signal, or both, the sidelink DRX pattern including a DRX cycle including an active duration and an inactive duration, where receiving the downlink signal or transmitting the uplink signal, or both, is based on the sidelink DRX pattern. In some examples, the network component 1035 may receive a downlink signal from a base station during an inactive duration of a DRX cycle associated with the group of UEs. In some examples, the network component 1035 may transmit an uplink signal to the base station during the inactive duration of the DRX cycle associated with the group of UEs, where the inactive duration and the DRX cycle are common to the group of UEs.

The message component 1040 may receive an RRC reconfiguration message including the sidelink DRX configuration from the base station. In some examples, the message component 1040 may transmit a RRC reconfiguration complete message to the base station based on the RRC reconfiguration message, where operating according to the sidelink DRX configuration is based on the RRC reconfiguration complete message.

The resource pool component 1045 may refrain from monitoring one or more resource pools during an inactive duration of a DRX cycle based on the group sidelink DRX configuration. In some examples, the resource pool component 1045 may refrain from monitoring one or more resource pools associated with monitoring the sidelink channel for a discovery signal based on a group resource pool configuration associated with monitoring for the discovery signal.

The synchronization component 1050 may synchronize with the group of UEs based on a synchronization signal received on a sidelink broadcast channel from at least one UE associated with the group of UEs. In some examples, the synchronization component 1050 may transmit a synchronization signal to the second UE on a sidelink broadcast channel. In some examples, the synchronization component 1050 may synchronize with the second UE based on the synchronization signal. The sidelink component 1055 may establish a connection with the second UE to relay communications for the UE, where the relay communications correspond to a L2 forwarding function or a L3 forwarding function.

Figure 11:
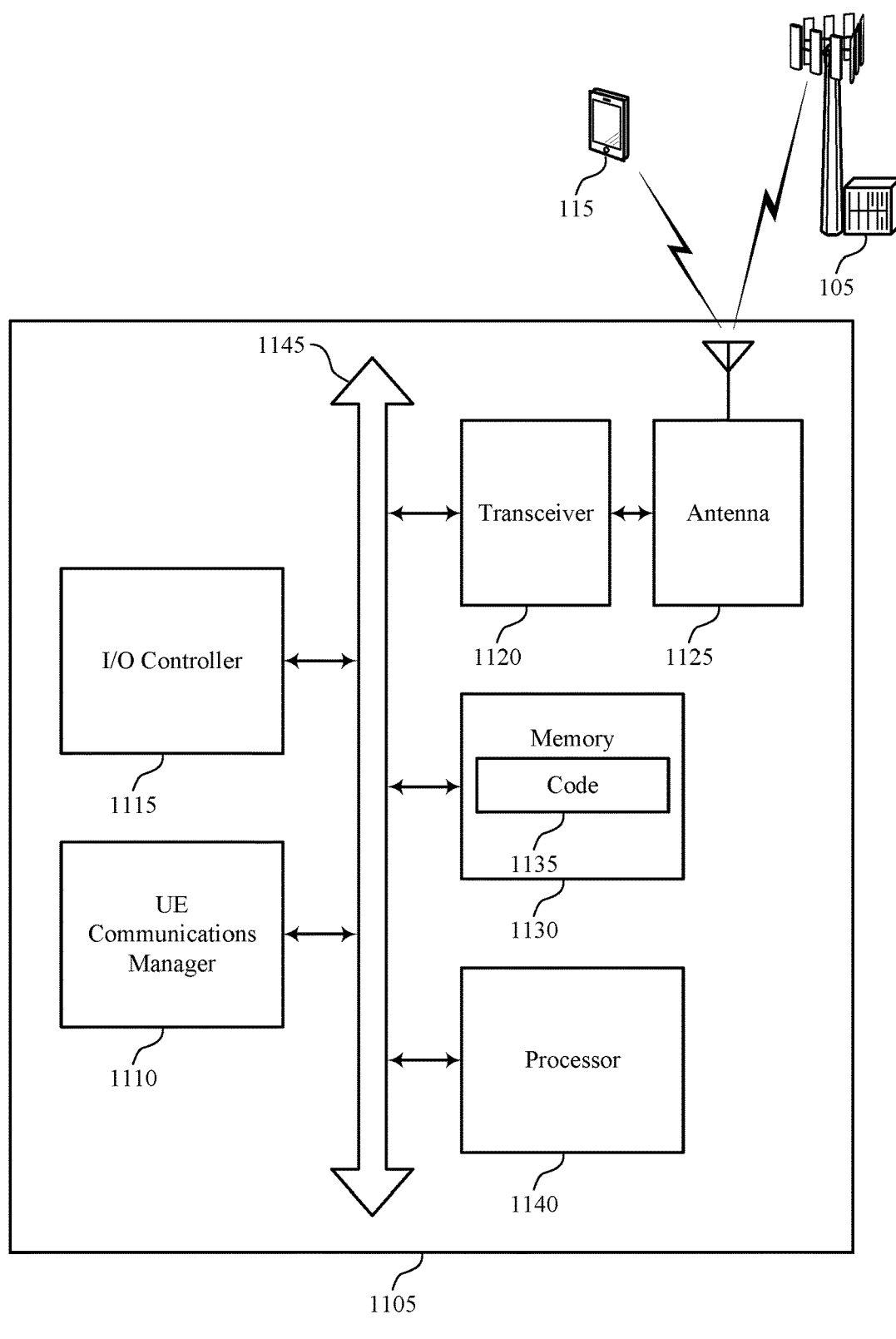
FIG. 11 shows a diagram of a system including a device in accordance with one or more aspects of the present disclosure.

FIG. 11 shows a diagram of a system 1100 including a device 1105 in accordance with one or more aspects of the present disclosure. The device 1105 may be an example of or include the components of device 805, device 905, or a UE 115 as described herein. The device 1105 may include components for bi-directional voice and data communications including components for transmitting and receiving communications, including a UE communications manager 1110, an I/O controller 1115, a transceiver 1120, an antenna 1125, memory 1130, and a processor 1140. These components may be in electronic communication via one or more buses (e.g., bus 1145).

The UE communications manager 1110 may transmit sidelink DRX information to a base station while operating in a connected mode. The UE communications manager 1110 may receive a message including a sidelink DRX configuration from the base station based on the sidelink DRX information, and operate according to the sidelink DRX configuration.

The UE communications manager 1110 may also receive a message including a group sidelink DRX configuration associated with a group of UEs while operating in an out-of-coverage mode, an idle mode, or an inactive mode. The UE communications manager 1110 may determine a temporal period to enable discontinuous monitoring of a sidelink channel based on the group sidelink DRX configuration, and monitor the sidelink channel during the temporal period.

The UE communications manager 1110 may also determine a DRX cycle based on a sidelink DRX configuration, the DRX cycle including an active duration and an inactive duration. The UE communications manager 1110 may receive a discovery request message from a second UE during the active duration of the DRX cycle, and transmit a discovery response message to a second UE during the active duration of the DRX cycle.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the device 1105 may include a single antenna 1125. However, in some cases, the device 1105 may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor 1140 to perform various functions described herein. In some cases, the memory 1130 may contain, among other things, a BIOS which may control basic hardware or software operation such as the interaction with peripheral components or devices.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting DRX for sidelink communications in wireless communications systems).

Figure 12:
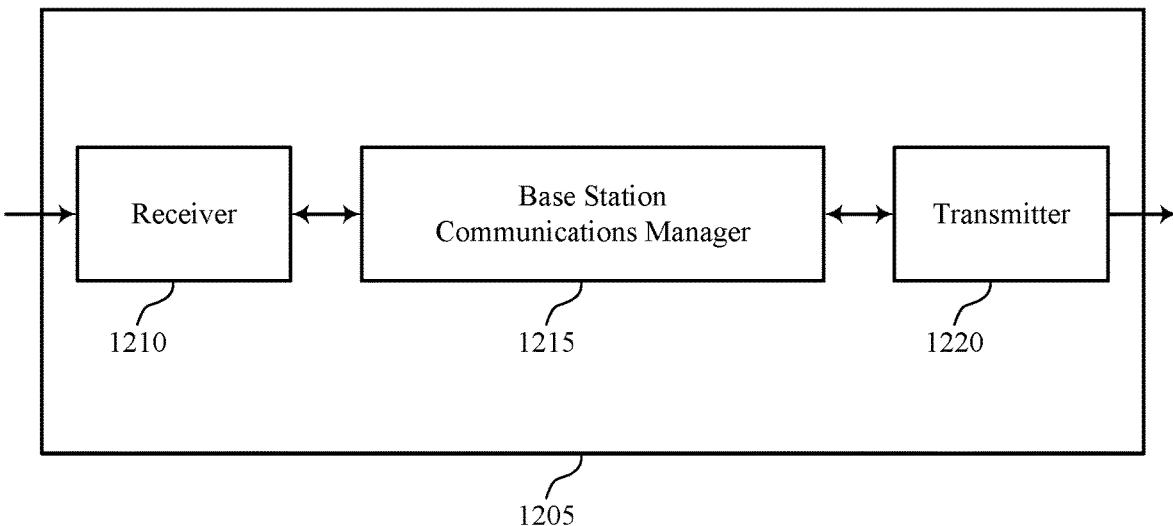
FIGS. 12 and 13 show block diagrams of devices in accordance with one or more aspects of the present disclosure.

FIG. 12 shows a block diagram 1200 of a device 1205 in accordance with one or more aspects of the present disclosure. The device 1205 may be an example of aspects of a base station 105 as described herein. The device 1205 may include a receiver 1210, a base station communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to DRX for sidelink communications in wireless communications systems, etc.). Information may be passed on to other components of the device 1205. The receiver 1210 may be an example of aspects of the transceiver 1520 described with reference to FIG. 15. The receiver 1210 may utilize a single antenna or a set of antennas.

The base station communications manager 1215 may receive sidelink DRX information from a UE, determine a sidelink DRX pattern for the UE based on the sidelink DRX information, and transmit a message including a sidelink DRX configuration including an indication of the sidelink DRX pattern for the UE. The base station communications manager 1215 may be an example of aspects of the base station communications manager 1510 described herein.

The base station communications manager 1215, or its sub-components, may be implemented in hardware, code (e.g., software or firmware) executed by a processor, or any combination thereof. If implemented in code executed by a processor, the functions of the base station communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1215, or its sub-components, may be physically located at various positions, including being distributed such that portions of functions are implemented at different physical locations by one or more physical components. In some examples, the base station communications manager 1215, or its sub-components, may be a separate and distinct component in accordance with various aspects of the present disclosure. In some examples, the base station communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
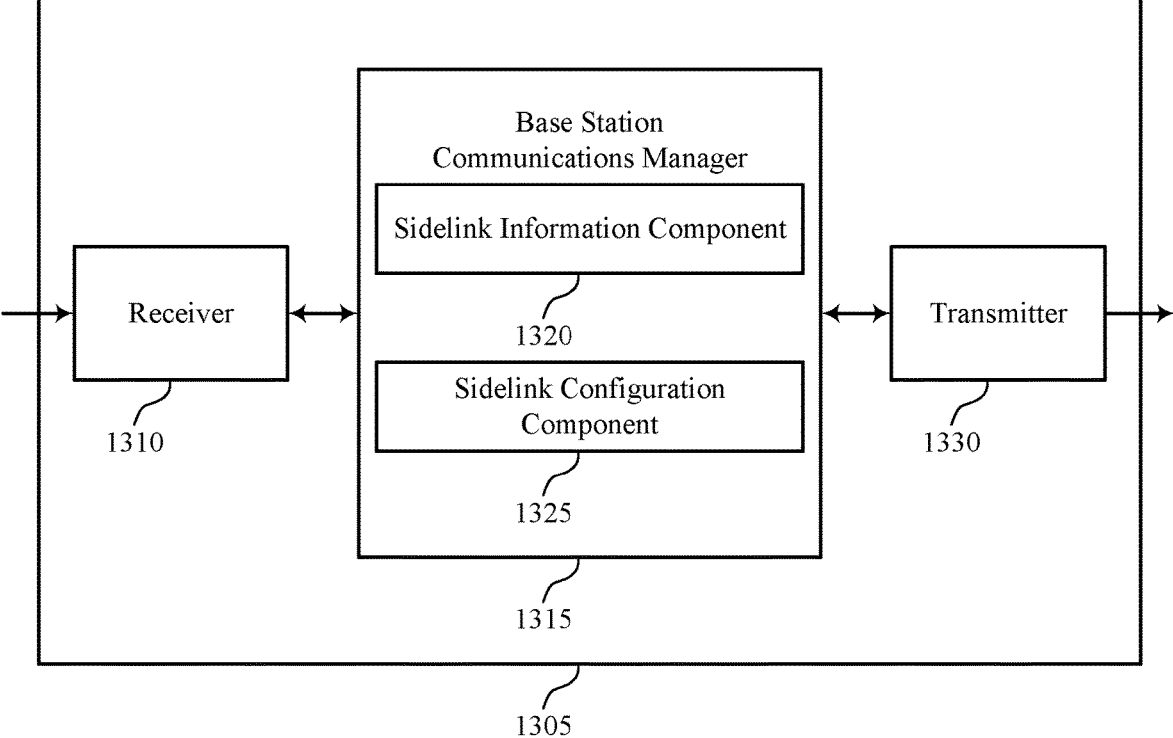

FIG. 13 shows a block diagram 1300 of a device 1305 in accordance with one or more aspects of the present disclosure. The device 1305 may be an example of aspects of a device 1205, or a base station 105 as described herein. The device 1305 may include a receiver 1310, a base station communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to DRX for sidelink communications in wireless communications systems, etc.). Information may be passed on to other components of the device 1305. The receiver 1310 may be an example of aspects of the transceiver 1520 described with reference to FIG. 15. The receiver 1310 may utilize a single antenna or a set of antennas.

The base station communications manager 1315 may be an example of aspects of the base station communications manager 1215 as described herein. The base station communications manager 1315 may include a sidelink information component 1320 and a sidelink configuration component 1325. The base station communications manager 1315 may be an example of aspects of the base station communications manager 1510 described herein. The sidelink information component 1320 may receive sidelink DRX information from a UE. The sidelink configuration component 1325 may determine a sidelink DRX pattern for the UE based on the sidelink DRX information and transmit a message including a sidelink DRX configuration including an indication of the sidelink DRX pattern for the UE.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

FIG. 14 shows a block diagram 1400 of a base station communications manager 1405 in accordance with one or more aspects of the present disclosure. The base station communications manager 1405 may be an example of aspects of a base station communications manager 1215, a base station communications manager 1315, or a base station communications manager 1510 described herein. The base station communications manager 1405 may include a sidelink information component 1410, a sidelink configuration component 1415, and a mode component 1420. Each of these modules may communicate, directly or indirectly, with one another (e.g., via one or more buses).

The sidelink information component 1410 may receive sidelink DRX information from a UE. In some examples, the sidelink information component 1410 may receive UAI including the sidelink DRX information from the UE. The sidelink configuration component 1415 may determine a sidelink DRX pattern for the UE based on the sidelink DRX information. In some examples, the sidelink configuration component 1415 may transmit a message including a sidelink DRX configuration including an indication of the sidelink DRX pattern for the UE. In some examples, the sidelink configuration component 1415 may transmit an RRC reconfiguration message including the sidelink DRX configuration to the UE. In some examples, the sidelink configuration component 1415 may receive an RRC reconfiguration complete message to the base station based on the RRC reconfiguration message. In some cases, the sidelink DRX configuration includes a connected mode DRX configuration. In some cases, the sidelink DRX configuration includes a sidelink DRX preference.

The mode component 1420 may determine the sidelink DRX pattern for the UE based on a resource pool configuration for the UE. In some examples, the mode component 1420 may determine a first sidelink DRX pattern associated with the sidelink DRX configuration for monitoring a sidelink channel for a discovery signal at the UE based on the sidelink DRX information. In some examples, the mode component 1420 may determine a second sidelink DRX pattern associated with the sidelink DRX configuration for receiving a downlink signal from the base station at the UE based on the sidelink DRX information, where the first sidelink DRX pattern is different from the second sidelink DRX pattern.

Figure 15:
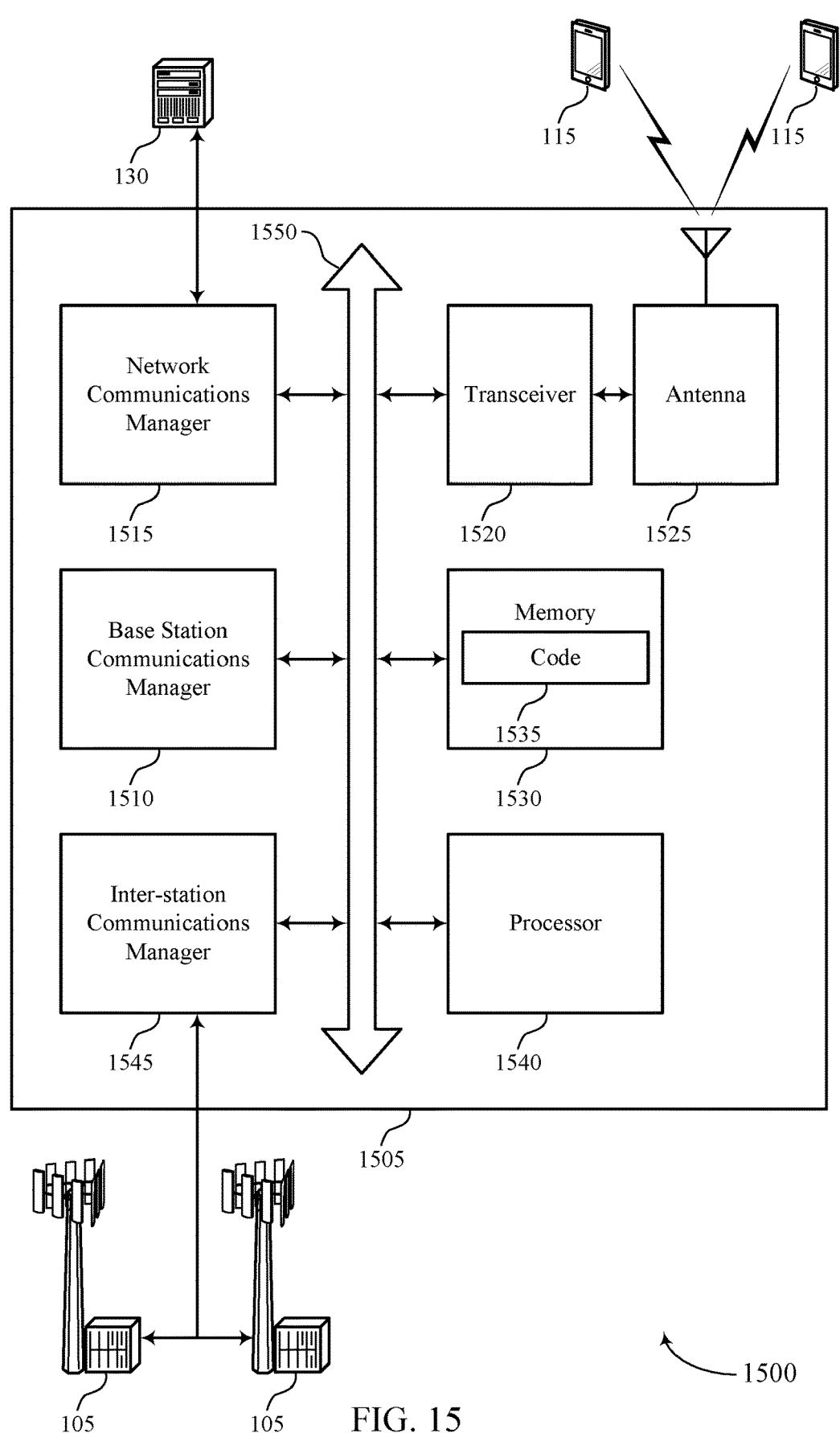
FIG. 15 shows a diagram of a system including a device in accordance with one or more aspects of the present disclosure.

FIG. 15 shows a diagram of a system 1500 including a device 1505 in accordance with one or more aspects of the present disclosure. The device 1505 may be an example of or include the components of device 1205, device 1305, or a base station 105 as described herein. The device 1505 may include components for bi-directional voice and data communications including components for transmitting and receiving communications, including a base station communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The base station communications manager 1510 may receive sidelink DRX information from a UE, determine a sidelink DRX pattern for the UE based on the sidelink DRX information, and transmit a message including a sidelink DRX configuration including an indication of the sidelink DRX pattern for the UE.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas. In some cases, the device 1505 may include a single antenna 1525. However, in some cases, the device 1505 may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting DRX for sidelink communications in wireless communications systems).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

Figure 16:
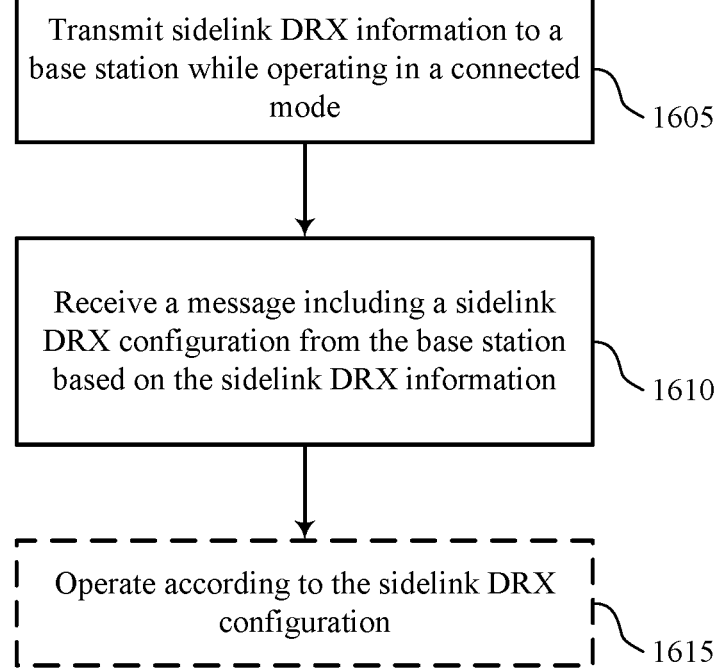

FIG. 16 shows a flowchart illustrating a method 1600 in accordance with one or more aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may transmit sidelink DRX information to a base station while operating in a connected mode. The operations of 1605 may be performed according to the methods described herein. In some examples, aspects of the operations of 1605 may be performed by a sidelink information component as described with reference to FIGS. 8 through 11.

At 1610, the UE may receive a message including a sidelink DRX configuration from the base station based on the sidelink DRX information. The operations of 1610 may be performed according to the methods described herein. In some examples, aspects of the operations of 1610 may be performed by a sidelink configuration component as described with reference to FIGS. 8 through 11.

At 1615, the UE may operate according to the sidelink DRX configuration. The operations of 1615 may be performed according to the methods described herein. In some examples, aspects of the operations of 1615 may be performed by a mode component as described with reference to FIGS. 8 through 11.

FIG. 17 shows a flowchart illustrating a method 1700 in accordance with one or more aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive a message including a group sidelink DRX configuration associated with a group of UEs while operating in an out-of-coverage mode, an idle mode, or an inactive mode. The operations of 1705 may be performed according to the methods described herein. In some examples, aspects of the operations of 1705 may be performed by a sidelink configuration component as described with reference to FIGS. 8 through 11.

At 1710, the UE may determine a temporal period to enable discontinuous monitoring of a sidelink channel based on the group sidelink DRX configuration. The operations of 1710 may be performed according to the methods described herein. In some examples, aspects of the operations of 1710 may be performed by a mode component as described with reference to FIGS. 8 through 11.

At 1715, the UE may monitor the sidelink channel during the temporal period. The operations of 1715 may be performed according to the methods described herein. In some examples, aspects of the operations of 1715 may be performed by a mode component as described with reference to FIGS. 8 through 11.

Figure 18:
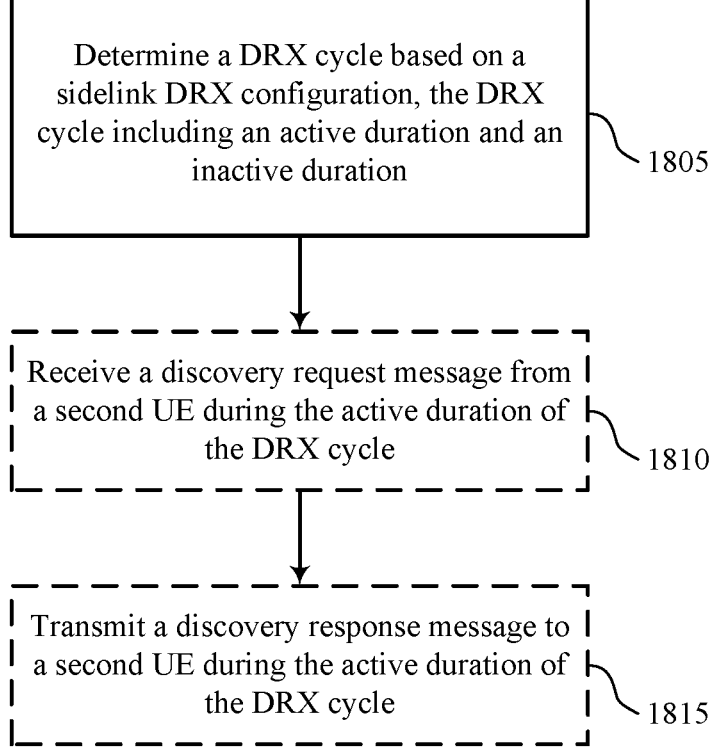

FIG. 18 shows a flowchart illustrating a method 1800 in accordance with one or more aspects of the present disclosure. The operations of method 1800 may be implemented by a UE 115 or its components as described herein. For example, the operations of method 1800 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may determine a DRX cycle based on a sidelink DRX configuration, the DRX cycle including an active duration and an inactive duration. The operations of 1805 may be performed according to the methods described herein. In some examples, aspects of the operations of 1805 may be performed by a sidelink configuration component as described with reference to FIGS. 8 through 11.

At 1810, the UE may receive a discovery request message from a second UE during the active duration of the DRX cycle. The operations of 1810 may be performed according to the methods described herein. In some examples, aspects of the operations of 1810 may be performed by a discover component as described with reference to FIGS. 8 through 11.

At 1815, the UE may transmit a discovery response message to a second UE during the active duration of the DRX cycle. The operations of 1815 may be performed according to the methods described herein. In some examples, aspects of the operations of 1815 may be performed by a discover component as described with reference to FIGS. 8 through 11.

Figure 19:
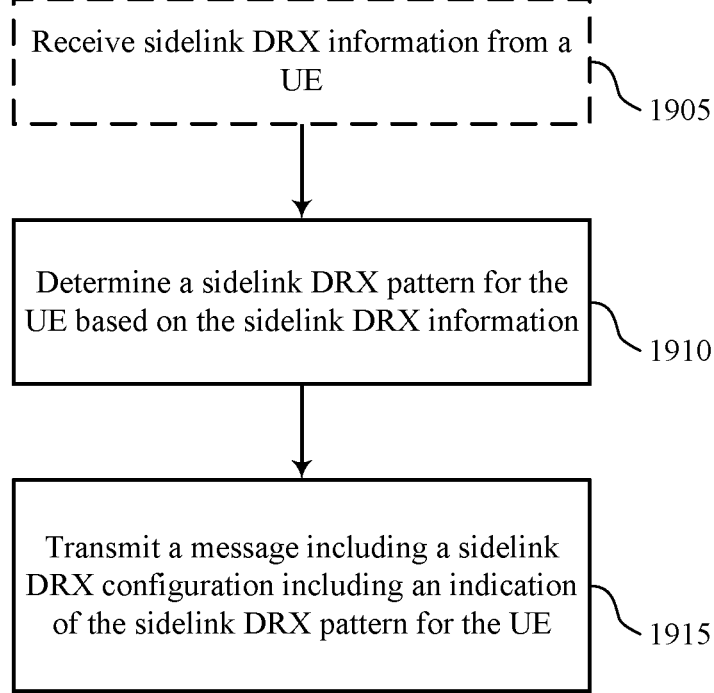

FIG. 19 shows a flowchart illustrating a method 1900 in accordance with one or more aspects of the present disclosure. The operations of method 1900 may be implemented by a base station 105 or its components as described herein. For example, the operations of method 1900 may be performed by a base station communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may receive sidelink DRX information from a UE. The operations of 1905 may be performed according to the methods described herein. In some examples, aspects of the operations of 1905 may be performed by a sidelink information component as described with reference to FIGS. 12 through 15.

At 1910, the base station may determine a sidelink DRX pattern for the UE based on the sidelink DRX information. The operations of 1910 may be performed according to the methods described herein. In some examples, aspects of the operations of 1910 may be performed by a sidelink configuration component as described with reference to FIGS. 12 through 15.

At 1915, the base station may transmit a message including a sidelink DRX configuration including an indication of the sidelink DRX pattern for the UE. The operations of 1915 may be performed according to the methods described herein. In some examples, aspects of the operations of 1915 may be performed by a sidelink configuration component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure:

Example 1: A method for wireless communication at a UE is described. The method may include transmitting sidelink discontinuous reception information to a base station while operating in a connected mode; receiving a message including a sidelink discontinuous reception configuration from the base station based at least in part on the sidelink discontinuous reception information; and operating according to the sidelink discontinuous reception configuration.

Example 2: The method of example 1, further comprising: monitoring a sidelink channel to receive a discovery signal from a second UE during an active duration of a discontinuous reception cycle based at least in part on the sidelink discontinuous reception configuration; and receiving the discovery signal from the second UE based at least in part on the monitoring.

Example 3: The method of examples 1 or 2, wherein the sidelink discontinuous reception configuration is based at least in part on a discovery resource pool corresponding to time and frequency resources associated with monitoring the sidelink channel to receive the discovery signal from the second UE.

Example 4: The method of examples 2 to 3, further comprising: broadcasting a discovery request message during the active duration of the discontinuous reception cycle based at least in part on the sidelink discontinuous reception configuration; monitoring the sidelink channel to receive a discovery response message from the second UE during the active duration of the discontinuous reception cycle; and receiving the discovery response message from the second UE based at least in part on the monitoring, the discovery signal comprising the discovery response message.

Example 5: The method of examples 2 to 4, further comprising: selecting the second UE for relay communications between the UE and the base station, or between the UE and a third UE, or both, based at least in part on the discovery signal, wherein the relay communications correspond to a layer 2 (L2) forwarding function or a layer 3 (L3) forwarding function.

Example 6: The method of examples 2 to 5, further comprising: determining, based at least in part on the sidelink discontinuous reception configuration, a sidelink discontinuous reception pattern for monitoring the sidelink channel to receive the discovery signal from the second UE, the sidelink discontinuous reception pattern comprising the discontinuous reception cycle including the active duration and an inactive duration.

Example 7: The method of examples 2 to 6, further comprising: receiving a synchronization signal from the second UE on a sidelink broadcast channel; and synchronizing with the second UE based at least in part on the synchronization signal.

Example 8: The method of examples 1 to 7, further comprising: receiving a downlink signal from the base station using a cellular link based at least in part on the sidelink discontinuous reception configuration; or transmitting an uplink signal to the base station using the cellular link based at least in part on the sidelink discontinuous reception configuration.

Example 9: The method of example 8, further comprising: determining, based at least in part on the sidelink discontinuous reception configuration, a sidelink discontinuous reception pattern for receiving the downlink signal or transmitting the uplink signal, or both, the sidelink discontinuous reception pattern comprising a discontinuous reception cycle including an active duration and an inactive duration, wherein receiving the downlink signal or transmitting the uplink signal, or both, is based at least in part on the sidelink discontinuous reception pattern.

Example 10: The method of examples 1 to 9, wherein receiving the message comprises: receiving a radio resource control reconfiguration message including the sidelink discontinuous reception configuration from the base station.

Example 11: The method of example 10, further comprising: transmitting a radio resource control reconfiguration complete message to the base station based at least in part on the radio resource control reconfiguration message, wherein operating according to the sidelink discontinuous reception configuration is based at least in part on the radio resource control reconfiguration complete message.

Example 12: The method of examples 1 to 11, further comprising: including the sidelink discontinuous reception information in UE-assistance information; and transmitting the UE-assistance information comprising the sidelink discontinuous reception information to the base station while operating in the connected mode, wherein receiving the message including the sidelink discontinuous reception configuration is based at least in part on the UE-assistance information.

Example 13: The method of examples 1 to 12, further comprising: determining a single connected mode discontinuous reception cycle for sidelink communications or cellular communications, or both, based at least in part on the sidelink discontinuous reception configuration, wherein operating according to the sidelink discontinuous reception configuration is based at least in part on the single connected mode discontinuous reception cycle.

Example 14: The method of examples 1 to 13, further comprising: determining a discontinuous reception cycle based at least in part on a relay service associated with a second UE or a quality-of-service associated with data traffic for the UE, or both, wherein the sidelink discontinuous reception information comprises an indication of the discontinuous reception cycle.

Example 15: The method of examples 1 to 14, further comprising: determining a value of an activity timer associated with a discontinuous reception cycle based at least in part on a relay service associated with a second UE or a quality-of-service associated with data traffic for the UE, or both, wherein the sidelink discontinuous reception information comprises an indication of the value of the activity timer associated with the discontinuous reception cycle.

Example 16: The method of examples 1 to 15, further comprising: determining a value of an inactivity timer associated with a discontinuous reception cycle based at least in part on a relay service associated with a second UE or a quality-of-service associated with data traffic for the UE, or both, wherein the sidelink discontinuous reception information comprises an indication of the value of the inactivity timer associated with the discontinuous reception cycle.

Example 17: The method of examples 1 to 16, further comprising: determining an offset between a beginning of a discontinuous reception cycle and a beginning of an active duration of the discontinuous reception cycle based at least in part on a relay service associated with a second UE or a quality-of-service associated with data traffic for the UE, or both, wherein the sidelink discontinuous reception information comprises an indication of the offset.

Example 18: The method of examples 1 to 17, further comprising: determining a first sidelink discontinuous reception pattern associated with the sidelink discontinuous reception configuration for monitoring a sidelink channel to receive a discovery signal based at least in part on the sidelink discontinuous reception configuration; and determining a second sidelink discontinuous reception pattern associated with the sidelink discontinuous reception configuration for receiving a downlink signal from the base station or transmitting an uplink signal to the base station, or both, based at least in part on the sidelink discontinuous reception configuration, wherein the first sidelink discontinuous reception pattern is different from the second sidelink discontinuous reception pattern.

Example 19: The method of example 18, wherein the sidelink discontinuous reception configuration comprises a first indication of the first sidelink discontinuous reception pattern or a second indication of the second sidelink discontinuous reception pattern, or both.

Example 20: The method of examples 1 to 19, wherein the sidelink discontinuous reception configuration comprises a connected mode discontinuous reception configuration.

Example 21: The method of examples 1 to 20, wherein the sidelink discontinuous reception configuration comprises a sidelink discontinuous reception preference associated with a discovery procedure comprising a first model discovery procedure or a second model discovery procedure.

Example 22: The method of examples 1 to 21, wherein the sidelink discontinuous reception configuration comprises a sidelink discontinuous reception preference associated with receiving a downlink signal from the base station or transmitting an uplink signal to the base station, or both.

Example 23: The method of examples 1 to 22, wherein the UE comprises a remote UE and a second UE comprises a relay UE between the remote UE and the base station.

Example 24: A method for wireless communication at a UE is described. The method may include: receiving a message including a group sidelink discontinuous reception configuration associated with a group of UEs while operating in an out-of-coverage mode, an idle mode, or an inactive mode; determining a temporal period to enable discontinuous monitoring of a sidelink channel based at least in part on the group sidelink discontinuous reception configuration; and monitoring the sidelink channel during the temporal period.

Example 25: The method of example 24, wherein receiving the message comprises: receiving a system information block or a radio resource control reconfiguration message including the group sidelink discontinuous reception configuration.

Example 26: The method of example 25, further comprising: enabling discontinuous monitoring of the sidelink channel based at least in part on the system information block or the radio resource control reconfiguration message.

Example 27: The method of example 25, further comprising: disabling a discontinuous reception mode based at least in part on a quality-of-service associated with pending data traffic satisfying a quality-of-service threshold.

Example 28: The method of examples 24 to 27, wherein the group sidelink discontinuous reception configuration comprises a discontinuous reception periodicity common to the group of UEs.

Example 29: The method of examples 24 to 28, wherein the sidelink discontinuous reception configuration comprises an active duration of a discontinuous reception cycle common to the group of UEs.

Example 30: The method of examples 24 to 29, wherein the sidelink discontinuous reception configuration comprises a group offset duration between a beginning of a discontinuous reception cycle and an active duration of the discontinuous reception cycle, wherein the group offset duration is common to the group of UEs.

Example 31: The method of examples 24 to 30, wherein the temporal period is common to the group of UEs.

Example 32: The method of examples 24 to 31, wherein the UE is grouped in the group of UEs based at least in part on a pathloss parameter.

Example 33: The method of examples 24 to 32, wherein the UE is grouped in the group of UEs based at least in part on a quality-of-service associated with data traffic of the UE.

Example 34: The method of examples 24 to 22, further comprising: determining a UE-specific offset duration associated with an active duration of a discontinuous reception cycle based at least in part on the sidelink discontinuous reception configuration, wherein monitoring the sidelink channel comprises; and monitoring the sidelink channel during the active duration of the discontinuous reception cycle based at least in part on the UE-specific offset duration.

Example 35: The method of example 34, wherein the UE-specific offset duration is based at least in part on a layer 2 (L2) identifier associated with the UE.

Example 36: The method of example 24 to 35, further comprising: enabling a discontinuous reception mode based at least in part on the message.

Example 37: The method of examples 24 to 36, further comprising: enabling a discontinuous reception mode based at least in part on a quality-of-service associated with pending data traffic satisfying a quality-of-service threshold.

Example 38: The method of examples 24 to 37, further comprising: enabling a discontinuous reception mode based at least in part on a power level of the UE satisfying a power level threshold.

Example 39: The method of examples 24 to 38, further comprising: refraining from monitoring one or more resource pools during an inactive duration of a discontinuous reception cycle based at least in part on the group sidelink discontinuous reception configuration.

Example 40: The method of examples 24 to 39, further comprising: refraining from monitoring one or more resource pools associated with monitoring the sidelink channel for a discovery signal based at least in part on a group resource pool configuration associated with monitoring for the discovery signal.

Example 41: The method of examples 24 to 40, further comprising: broadcasting a discovery request message during an inactive duration of a discontinuous reception cycle associated with the group of UEs based at least in part on a data traffic condition for the UE, wherein the inactive duration is common to the group of UEs, wherein the inactive duration and the discontinuous reception cycle are common to the group of UEs.

Example 42: The method of examples 24 to 41, further comprising: receiving a downlink signal from a base station during an inactive duration of a discontinuous reception cycle associated with the group of UEs; or transmitting an uplink signal to the base station during the inactive duration of the discontinuous reception cycle associated with the group of UEs, wherein the inactive duration and the discontinuous reception cycle are common to the group of UEs.

Example 43: The method of examples 24 to 42, further comprising: synchronizing with the group of UEs based at least in part on a synchronization signal received on a sidelink broadcast channel from at least one UE associated with the group of UEs.

Example 44: A method for wireless communication at a UE is described. The method may include determining a discontinuous reception cycle based at least in part on a sidelink discontinuous reception configuration, the discontinuous reception cycle comprising an active duration and an inactive duration; receiving a discovery request message from a second UE during the active duration of the discontinuous reception cycle; and transmitting a discovery response message to a second UE during the active duration of the discontinuous reception cycle.

Example 45: The method of example 44, wherein the sidelink discontinuous reception configuration is based at least in part on a discovery resource pool corresponding to time and frequency resources for receiving the discovery request message or transmitting the discovery response message, or both.

Example 46: The method of examples 44 or 45, further comprising: establishing a connection with the second UE to relay communications for the UE, wherein the relay communications correspond to a layer 2 (L2) forwarding function or a layer 3 (L3) forwarding function.

Example 47: The method of examples 44 to 46, further comprising: transmitting a synchronization signal to the second UE on a sidelink broadcast channel; and synchronizing with the second UE based at least in part on the synchronization signal.

Example 48: A method for wireless communication at a base station is described. The method may include: receiving sidelink discontinuous reception information from a UE; determining a sidelink discontinuous reception pattern for the UE based at least in part on the sidelink discontinuous reception information; and transmitting a message comprising a sidelink discontinuous reception configuration including an indication of the sidelink discontinuous reception pattern for the UE.

Example 49: The method of example 48, wherein transmitting the message comprises: transmitting a radio resource control reconfiguration message including the sidelink discontinuous reception configuration to the UE.

Example 50: The method of example 49, further comprising: receiving a radio resource control reconfiguration complete message to the base station based at least in part on the radio resource control reconfiguration message.

Example 51: The method of examples 48 to 50, further comprising: receiving UE-assistance information including the sidelink discontinuous reception information from the UE.

Example 52: The method of examples 48 to 51, further comprising: determining the sidelink discontinuous reception pattern for the UE based at least in part on a resource pool configuration for the UE.

Example 53: The method of examples 48 to 52, further comprising: determining a first sidelink discontinuous reception pattern associated with the sidelink discontinuous reception configuration for monitoring a sidelink channel for a discovery signal at the UE based at least in part on the sidelink discontinuous reception information; and determining a second sidelink discontinuous reception pattern associated with the sidelink discontinuous reception configuration for receiving a downlink signal from the base station at the UE based at least in part on the sidelink discontinuous reception information, wherein the first sidelink discontinuous reception pattern is different from the second sidelink discontinuous reception pattern.

Example 54: The method of examples 48 to 53, wherein the sidelink discontinuous reception configuration comprises a connected mode discontinuous reception configuration.

Example 55: The method of examples 48 to 54, wherein the sidelink discontinuous reception configuration comprises a sidelink discontinuous reception preference.

Example 56: An apparatus for wireless communication comprising a processor; and memory coupled to the processor, the processor and memory configured to perform a method of any of examples 1-23.

Example 57: An apparatus for wireless communication comprising at least one means for performing a method of any of examples 1-23.

Example 58: A computer-readable medium storing code for wireless communication, the code comprising instructions executable by a processor to perform a method of any of examples 1-23.

Example 59: An apparatus for wireless communication comprising a processor; and memory coupled to the processor, the processor and memory configured to perform a method of any of examples 24-43.

Example 60: An apparatus for wireless communication comprising at least one means for performing a method of any of examples 24-43.

Example 61: A computer-readable medium storing code for wireless communication, the code comprising instructions executable by a processor to perform a method of any of examples 24-43.

Example 62: An apparatus for wireless communication comprising a processor; and memory coupled to the processor, the processor and memory configured to perform a method of any of examples 44-47.

Example 63: An apparatus for wireless communication comprising at least one means for performing a method of any of examples 44-47.

Example 64: A computer-readable medium storing code for wireless communication, the code comprising instructions executable by a processor to perform a method of any of examples 44-47.

Example 65: An apparatus for wireless communication comprising a processor; and memory coupled to the processor, the processor and memory configured to perform a method of any of examples 48-55.

Example 66: An apparatus for wireless communication comprising at least one means for performing a method of any of examples 48-55.

Example 67: A computer-readable medium storing code for wireless communication, the code comprising instructions executable by a processor to perform a method of any of examples 48-55.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first user equipment (UE), comprising:
   one or more memories; and
   one or more processors coupled with the one or more memories and configured to cause the first UE to:
   transmit sidelink discontinuous reception information to a network entity;
   receive, from the network entity, an indication of a resource pool that includes a set of time and frequency resources to use to communicate one or more discovery messages to discover a second UE;
   receive, from the network entity, a message that includes a sidelink discontinuous reception configuration, the sidelink discontinuous reception configuration used to communicate the one or more discovery messages during a discontinuous reception cycle of the first UE; and
   communicate in accordance with the sidelink discontinuous reception configuration.

2. The apparatus of claim 1, wherein the one or more processors are further configured to cause the first UE to:

transmit a first discovery message during an active duration of the discontinuous reception cycle based at least in part on the sidelink discontinuous reception configuration;

monitor a sidelink channel to receive a second discovery message from the second UE during the active duration of the discontinuous reception cycle; and receive the second discovery message from the second UE.

3. The apparatus of claim 2, wherein the sidelink discontinuous reception configuration is based at least in part on the resource pool associated with the sidelink channel to receive the second discovery message from the second UE.

4. The apparatus of claim 2, wherein the one or more processors are further configured to cause the first UE to:

select the second UE for relay communications between the first UE and the network entity based at least in part on the second discovery message, wherein the relay communications correspond to one of a layer 2 (L2) function or a layer 3 (L3) function.

5. The apparatus of claim 2, wherein the one or more processors are further configured to cause the first UE to:

determine, based at least in part on the sidelink discontinuous reception configuration, a sidelink discontinuous reception pattern to monitor the sidelink channel to receive the second discovery message from the second UE.

6. The apparatus of claim 1, wherein, to receive the message, the one or more processors are configured to cause the first UE to:

receive system information that includes the sidelink discontinuous reception configuration from the network entity.

7. The apparatus of claim 1, wherein, to receive the message, the one or more processors are configured to cause the first UE to:

receive a radio resource control reconfiguration message that includes the sidelink discontinuous reception configuration from the network entity, wherein the one or more processors are further configured to cause the first UE to:

transmit a radio resource control reconfiguration complete message to the network entity based at least in part on the radio resource control reconfiguration message.

8. The apparatus of claim 1, wherein the one or more processors are further configured to cause the first UE to:

transmit assistance information that includes the sidelink discontinuous reception information to the network entity.

9. The apparatus of claim 1, wherein the one or more processors are further configured to cause the first UE to:

determine one or more of the discontinuous reception cycle, an activity timer associated with the discontinuous reception cycle, an inactivity timer associated with the discontinuous reception cycle, or an offset associated with the discontinuous reception cycle based at least in part on a relay service associated with the first UE or a quality-of-service associated with data traffic for the first UE, or both, wherein the sidelink discontinuous reception information indicates one or more of the discontinuous reception cycle, the activity timer associated with the discontinuous reception cycle, the inactivity timer associated with the discontinuous reception cycle, or the offset associated with the discontinuous reception cycle.

10. The apparatus of claim 1, wherein the one or more processors are further configured to cause the first UE to:

determine a sidelink discontinuous reception pattern to monitor a sidelink channel to receive the one or more discovery messages; and determine a discontinuous reception pattern to receive a downlink signal from the network entity or to transmit an uplink signal to the network entity, or both, wherein the sidelink discontinuous reception pattern is different from the discontinuous reception pattern, and wherein the sidelink discontinuous reception configuration comprises a first indication of the sidelink discontinuous reception pattern or a second indication of the discontinuous reception pattern, or both.

11. The apparatus of claim 1, wherein the first UE comprises a remote UE and the second UE comprises a relay UE between the remote UE and the network entity.

12. The apparatus of claim 1, wherein, to receive the message, the one or more processors are configured to cause the first UE to:

receive, from the network entity, a first radio resource control (RRC) reconfiguration message that includes the sidelink discontinuous reception configuration, the sidelink discontinuous reception configuration comprising a first discontinuous reception pattern for relay discovery monitoring.

13. The apparatus of claim 12, wherein the one or more processors are further configured to cause the first UE to:

receive, from the network entity, a second RRC reconfiguration message comprising a second discontinuous reception pattern for reception over a Uu interface.

14. An apparatus for wireless communication at a user equipment (UE), comprising:

one or more memories; and one or more processors coupled with the one or more memories and configured to cause the UE to:

receive, during operation in a connected mode, an out-of-coverage mode, an idle mode, or an inactive mode, a message that includes a group-common sidelink discontinuous reception configuration to be used by a group of UEs; and monitor a sidelink channel during a temporal period, the temporal period indicated by the group-common sidelink discontinuous reception configuration.

15. The apparatus of claim 14, wherein, to receive the message, the one or more processors are configured to cause the UE to:

receive system information, a radio resource control reconfiguration message, or both, that include the group-common sidelink discontinuous reception configuration.

16. The apparatus of claim 15, wherein the one or more processors are further configured to cause the UE to:

enable discontinuous monitoring of the sidelink channel based at least in part on the system information, the radio resource control reconfiguration message, or both.

17. The apparatus of claim 15, wherein the one or more processors are further configured to cause the UE to:

disable a discontinuous reception mode based at least in part on a quality-of-service associated with data traffic and a quality-of-service threshold.

18. The apparatus of claim 14, wherein the group-common sidelink discontinuous reception configuration comprises a discontinuous reception periodicity common to the group of UEs.

19. The apparatus of claim 14, wherein:

the group-common sidelink discontinuous reception configuration comprises an active duration of a discontinuous reception cycle common to the group of UEs, or a group-common offset duration between a start of the discontinuous reception cycle and the active duration of the discontinuous reception cycle, or both; and the group-common offset duration is common to the group of UEs.

20. The apparatus of claim 14, wherein the temporal period is common to the group of UEs.

21. The apparatus of claim 14, wherein the one or more processors are further configured to cause the UE to:

determine an offset duration associated with an active duration of a discontinuous reception cycle based at least in part on the group-common sidelink discontinuous reception configuration, wherein, to monitor the sidelink channel, the one or more processors are further configured to cause the UE to:

monitor the sidelink channel during the active duration of the discontinuous reception cycle based at least in part on the offset duration, wherein the offset duration is based at least in part on a layer 2 (L2) identifier associated with the UE.

22. The apparatus of claim 14, wherein the one or more processors are further configured to cause the UE to:

enable a discontinuous reception mode based at least in part on one or more of the message, a quality-of-service associated with data traffic and a quality-of-service threshold, or a power level of the UE and a power level threshold.

23. The apparatus of claim 14, wherein the one or more processors are further configured to cause the UE to:

refrain to monitor one or more resource pools during the inactive mode mode of a discontinuous reception cycle based at least in part on the group-common sidelink discontinuous reception configuration.

24. An apparatus for wireless communication at a first user equipment (UE), comprising:

one or more memories; and one or more processors coupled with the one or more memories and configured to cause the first UE to:

communicate a first discovery message with a second UE during an active duration of a discontinuous reception cycle, wherein the first discovery message is for identification of an available relay UE, and wherein the discontinuous reception cycle is based at least in part on a sidelink discontinuous reception configuration; and communicate a second discovery message with the second UE during the active duration of the discontinuous reception cycle.

25. The apparatus of claim 24, wherein the sidelink discontinuous reception configuration is based at least in part on a resource pool used to perform discovery operations, the first discovery message or the second discovery message, or both.

26. The apparatus of claim 24, wherein the sidelink discontinuous reception configuration comprises a group sidelink discontinuous reception configuration.

27. An apparatus for wireless communication at a network entity, comprising:

one or more memories; and one or more processors coupled with the one or more memories and configured to cause the network entity to:

obtain sidelink discontinuous reception information from a user equipment (UE); and output a message comprising a sidelink discontinuous reception configuration that includes an indication of a sidelink discontinuous reception pattern for the UE, the sidelink discontinuous reception pattern for the UE comprising a set of active durations of a discontinuous reception cycle of the UE and a set of inactive durations of the discontinuous reception cycle indicated by the sidelink discontinuous reception information.

28. The apparatus of claim 27, wherein, to transmit the message, the one or more processors are configured to cause the network entity to:

output, to the UE, a radio resource control reconfiguration message, that includes the sidelink discontinuous reception configuration; and obtain a radio resource control reconfiguration complete message based at least in part on the radio resource control reconfiguration message.

29. The apparatus of claim 27, wherein the one or more processors are further configured to cause the network entity to:

obtain assistance information that includes the sidelink discontinuous reception information from the UE.

30. The apparatus of claim 27, wherein the one or more processors are further configured to cause the network entity to:

determine the sidelink discontinuous reception pattern for the UE based at least in part on a resource pool configuration for the UE.

31. The apparatus of claim 27, wherein the one or more processors are further configured to cause the network entity to:

determine a first sidelink discontinuous reception pattern for a sidelink channel for a discovery message; and determine a second sidelink discontinuous reception pattern to transmit a downlink signal, wherein the first sidelink discontinuous reception pattern is different from the second sidelink discontinuous reception pattern.

32. The apparatus of claim 27, wherein, to output the message, the one or more processors are configured to cause the network entity to:

output a group sidelink discontinuous reception configuration associated with a group of UEs, wherein the message comprises system information, a radio resource control reconfiguration message, or both.

33. The apparatus of claim 32, wherein the group sidelink discontinuous reception configuration comprises a discontinuous reception periodicity common to the group of UEs.

34. The apparatus of claim 27, wherein, to output the message, the one or more processors are configured to cause the network entity to:

output, to the UE, a first radio resource control (RRC) reconfiguration message that includes the sidelink discontinuous reception configuration, wherein the sidelink discontinuous reception configuration includes an indication of a first discontinuous reception pattern for relay discovery monitoring for the UE.

35. The apparatus of claim 34, wherein the one or more processors are further configured to cause the network entity to:

output a second RRC reconfiguration message comprising a second discontinuous reception pattern for reception over a Uu interface.

36. A method for wireless communication at a first user equipment (UE), comprising:

transmitting sidelink discontinuous reception information to a network entity;

receiving, from the network entity, an indication of a resource pool including a set of time and frequency resources to use to communicate one or more discovery messages to discover a second UE;

receiving, from the network entity, a message including a sidelink discontinuous reception configuration, the sidelink discontinuous reception configuration used to communicate the one or more discovery messages during a discontinuous reception cycle of the first UE; and communicating in accordance with the sidelink discontinuous reception configuration.

37. The method of claim 36, further comprising:

transmitting a first discovery message during an active duration of the discontinuous reception cycle based at least in part on the sidelink discontinuous reception configuration;

monitoring a sidelink channel to receive a second discovery message from the second UE during the active duration of the discontinuous reception cycle; and receiving the second discovery message from the second UE.

38. The method of claim 36, wherein receiving the message comprises:

receiving a radio resource control reconfiguration message including the sidelink discontinuous reception configuration from the network entity, wherein the method further comprises:

transmitting a radio resource control reconfiguration complete message to the network entity based at least in part on the radio resource control reconfiguration message.

39. The method of claim 36, wherein receiving the message comprises:

receiving, from the network entity, a first radio resource control (RRC) reconfiguration message that includes the sidelink discontinuous reception configuration, the sidelink discontinuous reception configuration comprising a first discontinuous reception pattern for relay discovery monitoring.

40. The method of claim 39, further comprising:

receiving, from the network entity, a second RRC reconfiguration message comprising a second discontinuous reception pattern for reception over a Uu interface.

41. A method for wireless communication at a user equipment (UE), comprising:

receiving, during operation in a connected mode, an out-of-coverage mode, an idle mode, or an inactive mode, a message including a group-common sidelink discontinuous reception configuration to be used by a group of UEs; and monitoring a sidelink channel during a temporal period, the temporal period indicated by the group-common sidelink discontinuous reception configuration.

42. The method of claim 41, wherein receiving the message comprises:

receiving system information, a radio resource control reconfiguration message, or both, including the group-common sidelink discontinuous reception configuration.

43. The method of claim 41, wherein:

the group-common sidelink discontinuous reception configuration comprises an active duration of a discontinuous reception cycle common to the group of UEs, or a group-common offset duration between a start of the discontinuous reception cycle and the active duration of the discontinuous reception cycle, or both; and the group-common offset duration is common to the group of UEs.

44. A method for wireless communication at a first user equipment (UE), comprising:

communicating a first discovery message with a second UE during an active duration of a discontinuous reception cycle, wherein the first discovery message is for identification of an available relay UE, and wherein the discontinuous reception cycle is based at least in part on a sidelink discontinuous reception configuration; and communicating a second discovery message with the second UE during the active duration of the discontinuous reception cycle.

45. The method of claim 44, wherein the sidelink discontinuous reception configuration is based at least in part on a resource pool to use to perform discovery operations, the first discovery message or the second discovery message, or both.

46. A method for wireless communication at a network entity, comprising:

obtaining sidelink discontinuous reception information from a user equipment (UE); and outputting a message comprising a sidelink discontinuous reception configuration including an indication of a sidelink discontinuous reception pattern for the UE, the sidelink discontinuous reception pattern for the UE comprising a set of active durations of a discontinuous reception cycle of the UE and a set of inactive durations of the discontinuous reception cycle indicated by the sidelink discontinuous reception information.

47. The method of claim 46, wherein outputting the message comprises:

outputting a radio resource control reconfiguration message, including the sidelink discontinuous reception configuration to the UE; and obtaining a radio resource control reconfiguration complete message based at least in part on the radio resource control reconfiguration message.

48. The method of claim 46, wherein outputting the message comprises:

outputting a group sidelink discontinuous reception configuration associated with a group of UEs, wherein the message comprises system information or a radio resource control reconfiguration message.

49. The method of claim 46, wherein outputting the message comprises:

outputting, to the UE, a first radio resource control (RRC) reconfiguration message that includes the sidelink discontinuous reception configuration, wherein the sidelink discontinuous reception configuration includes an indication of a first discontinuous reception pattern for relay discovery monitoring for the UE.

50. The method of claim 49, further comprising:

outputting a second RRC reconfiguration message comprising a second discontinuous reception pattern for reception over a Uu interface.

51. A non-transitory computer-readable medium storing code for wireless communication at a first user equipment (UE), the code comprising instructions executable by one or more processors to cause the first UE to:

transmit sidelink discontinuous reception information to a network entity;

receive, from the network entity, an indication of a resource pool that includes a set of time and frequency resources to use to communicate one or more discovery messages to discover a second UE;

receive, from the network entity, a message that includes a sidelink discontinuous reception configuration, the sidelink discontinuous reception configuration used to communicate the one or more discovery messages during a discontinuous reception cycle of the first UE; and communicate in accordance with the sidelink discontinuous reception configuration.

52. A non-transitory computer-readable medium storing code for wireless communication at a user equipment (UE), the code comprising instructions executable by one or more processors to cause the UE to:

receive, during operation in a connected mode, an out-of-coverage mode, an idle mode, or an inactive mode, a message that includes a group-common sidelink discontinuous reception configuration to be used by a group of UEs; and monitor a sidelink channel during a temporal period, the temporal period indicated by the group-common sidelink discontinuous reception configuration.

53. A non-transitory computer-readable medium storing code for wireless communication at a first user equipment (UE), the code comprising instructions executable by one or more processors to cause the first UE to:

communicate a first discovery message with a second UE during an active duration of a discontinuous reception cycle, wherein the first discovery message is for identification of an available relay UE, and wherein the discontinuous reception cycle is based at least in part on a sidelink discontinuous reception configuration; and communicate a second discovery message with the second UE during the active duration of the discontinuous reception cycle.

54. A non-transitory computer-readable medium storing code for wireless communication at a network entity, the code comprising instructions executable by one or more processors to cause the network entity to:

obtain sidelink discontinuous reception information from a user equipment (UE); and output a message comprising a sidelink discontinuous reception configuration that includes an indication of a sidelink discontinuous reception pattern for the UE, the sidelink discontinuous reception pattern for the UE comprising a set of active durations of a discontinuous reception cycle of the UE and a set of inactive durations of the discontinuous reception cycle indicated by the sidelink discontinuous reception information.

* * * * *